(12) United States Patent
Liu

(10) Patent No.: US 12,501,296 B2
(45) Date of Patent: Dec. 16, 2025

(54) NODE CONTROL METHOD, SYSTEM, AND APPARATUS

(71) Applicant: Huawei Technologies Co., Ltd., Shenzhen (CN)

(72) Inventor: Huiyong Liu, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 560 days.

(21) Appl. No.: 17/974,911

(22) Filed: Oct. 27, 2022

(65) Prior Publication Data
US 2023/0039817 A1 Feb. 9, 2023

Related U.S. Application Data

(63) Continuation of application No. PCT/CN2021/087365, filed on Apr. 15, 2021.

(30) Foreign Application Priority Data

Apr. 28, 2020 (CN) .......................... 202010352126.0

(51) Int. Cl.
H04W 24/08 (2009.01)
H04W 24/02 (2009.01)

(52) U.S. Cl.
CPC .......... *H04W 24/08* (2013.01); *H04W 24/02* (2013.01)

(58) Field of Classification Search
CPC . H04L 43/20; H04L 41/0668; H04L 43/0811; H04L 43/10; H04L 45/28;
(Continued)

(56) References Cited

U.S. PATENT DOCUMENTS

2017/0118068 A1\* 4/2017 Fleeman ................. H04L 45/28
2018/0123870 A1 5/2018 Xue et al.
(Continued)

FOREIGN PATENT DOCUMENTS

CN 106664246 A 5/2017
CN 108282801 A 7/2018
(Continued)

OTHER PUBLICATIONS

Zhang, L., et al., "QCSS: A QoE-aware Control Plane for Adaptive Streaming Service over Mobile Edge Computing Infrastructures", 2018 IEEE International Conference on Web Services (ICWS), Jul. 2-7, 2018, 8 Pages.

*Primary Examiner* — Khoa Huynh
(74) *Attorney, Agent, or Firm* — Slater Matsil, LLP

(57) ABSTRACT

A method includes: a first node monitors a status of a connection between the first node and a center system, and switches to the standby node working mode when the status of the connection between the first node and the center system is disconnected. The center system monitors a status of a connection between the center system and the first node, and sends a switch-to-master command to a second node when the status of the connection between the center system and the first node is disconnected. The second node switches to the master node working mode based on the switch-to-master command. Accordingly, whether a master node is switched to a standby node is determined through connectivity detection between the node and the center system, and whether a standby node is switched to a master node is determined based on an indication of the center system.

19 Claims, 7 Drawing Sheets

(58) Field of Classification Search
CPC ...... H04L 45/58; H04W 24/08; H04W 24/02; H04W 24/04
See application file for complete search history.

(56) References Cited

U.S. PATENT DOCUMENTS

2018/0376380 A1    12/2018  Leroux
2020/0252293 A1*    8/2020  Rajagopalan ........... H04L 49/35

FOREIGN PATENT DOCUMENTS

| CN | 109005045 A |   | 12/2018 |
|----|-------------|---|---------|
| CN | 109495938 A |   | 3/2019  |
| CN | 109861867 A | * | 6/2019  |
| CN | 110417600 A |   | 11/2019 |

* cited by examiner

NODE CONTROL METHOD, SYSTEM, AND APPARATUS

CROSS-REFERENCE TO RELATED APPLICATIONS

This application is a continuation of International Application No. PCT/CN2021/087365, filed on Apr. 15, 2021, which claims priority to Chinese Patent Application No. 202010352126.0, filed on Apr. 28, 2020. The disclosures of the aforementioned applications are hereby incorporated by reference in their entireties.

TECHNICAL FIELD

This disclosure relates to the communication field, and in particular, to a node control method, system, and apparatus.

BACKGROUND

The European Telecommunications Standards Institute (ETSI) has proposed a mobile edge computing (MEC) technology based on a 5th generation (5G) evolution architecture. The MEC technology can improve user experience and save bandwidth resources. In addition, the MEC technology provides an infinite possibility for service innovation at a mobile edge entry by sinking a computing capability to a mobile edge node to provide third-party application integration.

An orchestration capability of a virtualized network function manager (VNFM) is indispensable to the MEC technology. For example, VNFM "dual-master" and "no-master" problems also need to be considered in the MEC technology.

The "dual-master" problem indicates a phenomenon that two machines or two nodes in a master-standby relationship both change to master nodes under a specific condition. When this phenomenon occurs, the two nodes process a same service as the master nodes. As a result, service processing results on the two nodes may be inconsistent. Therefore, a dual machine in a master-standby mode needs to avoid this case as much as possible. Similarly, the "no-master" problem indicates a phenomenon that two machines or two nodes in a master-standby relationship both change to standby nodes under a specific condition. When this phenomenon occurs, the two nodes are both used as the standby nodes. As a result, a service is interrupted.

Therefore, the VNFM "dual-master" and "no-master" problems are problems that urgently need to be resolved.

SUMMARY

This disclosure provides a node control method, system, and apparatus, to resolve a dual-master problem at low costs and avoid a no-master problem.

According to a first aspect, a node control method is provided, applicable to a node control system. The node control system includes: a first node, a second node, and a center system. The first node and the second node are located in an edge system, and the first node and the second node are both connected to the center system. A current working mode of the first node is a master node working mode, and a current working mode of the second node is a standby node working mode. The method includes: The first node monitors a status of a connection between the first node and the center system, and switches to the standby node working mode when the connection between the first node and the center system is disconnected. The center system monitors a status of a connection between the center system and the first node, and sends a switch-to-master command to the second node when the connection between the center system and the first node is disconnected, where the switch-to-master command notifies to switch from the standby node working mode to the master node working mode. The second node switches to the master node working mode based on the switch-to-master command.

For example, that the connection between the first node and the center system is disconnected, and that the connection between the center system and the first node is disconnected both mean that the status of the connection between the center system and the first node is a disconnected state.

It should be understood that the current working mode of the first node is the master node working mode, and the current working mode of the second node is the standby node working mode. This is only an example, and means that at a specific time point, in a plurality of nodes (for example, two nodes, or at least two nodes) in the edge system, one node is in the master node working mode, and other nodes are in the standby node working mode.

Based on the foregoing technical solution, a switch-to-standby operation is performed when the node in the master node working mode detects that a connection between the node and the center system is disconnected; and a switch-to-master operation is performed after the node in the standby node working mode receives the switch-to-master command from the center system. Specifically, whether the node in the master node working mode needs to be switched to a standby node (in other words, be switched from an original master node to a standby node) is determined through connectivity detection between the node in the master node working mode and the center system. This avoids a dual-master problem. In this manner, not only the dual-master problem can be avoided, but also a case in which it is found that a network is unavailable after switching can be avoided, so that invalid switching time consumption is reduced. In addition, a no-master problem can be avoided by integrating an arbitration capability into the center system. For example, the center system may deliver the switch-to-master command to the node in the standby node working mode, so that the original standby node switches to the master node working mode. Therefore, there is no need to add a new arbitration node. Instead, a switching capability is integrated into the center system. This can reduce an additional resource waste, and avoid the no-master problem. In addition, the center system may determine, based on a status of a connection between the center system and the node in the master node working mode, whether to deliver the switch-to-master command. This can reduce unnecessary switching and save switching time. For example, this embodiment of this disclosure is further applicable to an MEC technology, to resolve a dual-master problem and a no-master problem that may occur in the MEC technology.

With reference to the first aspect, in some implementations of the first aspect, the first node monitors a status of a connection between the first node and the second node, and/or the second node monitors a status of a connection between the second node and the first node; and maintains the current working mode of the first node and/or the current working mode of the second node when determining that the connection between the first node and the second node is disconnected or connected.

Based on the foregoing technical solution, whether the node in the master node state needs to be subject to the switch-to-standby operation (in other words, be switched to the standby node) is determined based on detection between the nodes, for example, heartbeat detection, in combination with detection between the node and the center system. This avoids the dual-master problem. In addition, the node in the master node working mode determines, based on the connection between the node and the center system, whether to be switched to the standby node. Therefore, even if hardware fails (for example, a network adapter of a physical host fails, a physical host fails, or a network device fails), or the master node or the standby node cannot detect a heartbeat of a peer end due to an internal software fault (a fault not caused by a factor such as a network adapter or a network), the dual-master problem caused by misjudgment does not occur.

With reference to the first aspect, in some implementations of the first aspect, that the first node monitors a status of a connection between the first node and the center system includes: The first node monitors a status of a connection between the first node and a gateway, where the gateway is located between the first node and the center system.

Based on the foregoing technical solution, whether the node in the master node working mode needs to be switched to the standby node may be determined according to connectivity between the node and the gateway.

With reference to the first aspect, in some implementations of the first aspect, the gateway is located within the edge system.

According to a second aspect, a node control method is provided, applicable to a first node in an edge system. The first node is connected to a center system. The method includes: The first node monitors a status of a connection between the first node and the center system when determining that a current working mode of the first node is a master node working mode, and switches to a standby node working mode when determining that the connection between the first node and the center system is disconnected. The first node monitors a command from the center system when determining that the current working mode of the first node is the standby node working mode, and switches to the master node working mode when receiving a switch-to-master command sent by the center system, where the switch-to-master command notifies to switch from the standby node working mode to the master node working mode.

For example, the switch-to-master command may be received when a connection between a second node currently in the master node working mode and the center system is disconnected, the edge system further includes the second node, and the second node is connected to the center system.

For example, if determining that the first node is in the master node working mode, the first node switches to the standby node working mode when detecting that the connection between the first node and the center system is disconnected. In other words, if being in the master node working mode, the first node switches to the standby node working mode when detecting that the connection between the first node and the center system is disconnected. It may be understood that a switch-to-standby operation is performed when the node in the master node working mode detects that the connection between the node and the center system is disconnected.

For example, if determining that the node is in the standby node working mode, the node maintains the standby node working mode when detecting that the connection between the node and the center system is disconnected.

For example, if determining that the node is in the standby node working mode, the node monitors the command from the center system, and switches to the master node working mode when receiving the switch-to-master command from the center system. In other words, if being in the standby node working mode, the first node switches to the master node working mode when receiving the switch-to-master command from the center system. It may be understood that a switch-to-master operation is performed after the node in the standby node working mode receives the switch-to-master command from the center system.

For example, monitoring the command from the center system indicates being in a monitoring state or being in a receiving state.

Based on the foregoing technical solution, the switch-to-standby operation is performed when the node in the master node working mode detects that the connection between the node and the center system is disconnected; and the switch-to-master operation is performed after the node in the standby node working mode receives the switch-to-master command from the center system. Specifically, whether the node in the master node working mode needs to be switched to a standby node (in other words, be switched from an original master node to a standby node) is determined through connectivity detection between the node in the master node working mode and the center system. This avoids a dual-master problem. In this manner, not only the dual-master problem can be avoided, but also a case in which it is found that a network is unavailable after switching can be avoided, so that invalid switching time consumption is reduced. In addition, a no-master problem can be avoided by integrating an arbitration capability into the center system. For example, the center system may deliver the switch-to-master command to the node in the standby node working mode, so that the original standby node switches to the master node working mode. Therefore, there is no need to add a new arbitration node. Instead, a switching capability is integrated into the center system. This can reduce an additional resource waste, and avoid the no-master problem. In addition, the center system may determine, based on a status of a connection between the center system and the node in the master node working mode, whether to deliver the switch-to-master command. This can reduce unnecessary switching and save switching time. For example, this embodiment of this application is further applicable to an MEC technology, to resolve a dual-master problem and a no-master problem that may occur in the MEC technology.

With reference to the second aspect, in some implementations of the second aspect, the edge system further includes a second node, and the second node is connected to the center system. The first node monitors a status of a connection between the first node and the second node; and maintains the current working mode of the first node when determining that the connection between the first node and the second node is disconnected or connected.

For example, the first node detects that the connection between the first node and the second node is disconnected and the connection between the first node and the center system is disconnected. In this case, the first node switches to the standby node working mode if being in the master node working mode; or maintains the standby node working mode if being in the standby node working mode. The first node detects that the connection between the first node and the second node is disconnected, and does not detect that the connection between the first node and the center system is disconnected. In this case, the first node does not perform processing regardless of whether the first node is in the master node working mode or the standby node working mode.

For example, the first node may periodically detect the connection between the first node and the second node. For example, after the system is started, the first node may periodically detect the connection between the first node and the second node.

For example, the first node detects, by pinging a gateway IP address or sending a message (for example, a heartbeat signal), whether the connection between the first node and the second node is normal.

With reference to the second aspect, in some implementations of the second aspect, that the first node monitors a status of a connection between the first node and the center system includes: The first node monitors a status of a connection between the first node and a gateway, where the gateway is located between the first node and the center system.

For example, the first node periodically detects the connection between the first node and the gateway. For example, after the system is started, the first node may periodically detect the connection between the first node and the gateway.

With reference to the second aspect, in some implementations of the second aspect, the gateway is located within the edge system.

With reference to the second aspect, in some implementations of the second aspect, the method further includes: determining, when detecting that the first node is in an active state, that the current working mode of the first node is the master node working mode, or determining, when detecting that the first node is in an inactive state, that the current working mode of the first node is the standby node working mode; or determining, when detecting that a service application on the first node is in a running state, that the current working mode of the first node is the master node working mode, or determining, when detecting that a service application on the first node is in a stopped state, that the current working mode of the first node is the standby node working mode; or determining, when detecting that no state identifier exists on the first node, that the current working mode of the first node is the master node working mode, or determining, when detecting that a state identifier exists on the first node, that the current working mode of the first node is the standby node working mode.

For example, the active state may indicate whether an external service may be provided. In other words, the master node provides the external service. For example, when it is detected that the first node provides the external service, it is determined that the current working mode of the first node is the master node working mode; or when it is detected that the first node cannot provide the external service, it is determined that the current working mode of the first node is the standby node working mode.

Based on the foregoing technical solution, whether the node is the master node or the standby node may be determined by using a state of the node, a state of a service application on the node, an identifier, or the like.

According to a third aspect, a node control method is provided. The method includes: A center system monitors a status of a connection between the center system and a first node, where a current working mode of the first node is a master node working mode; and sends a switch-to-master command to a second node when the connection between the center system and the first node is disconnected, where a current working mode of the second node is a standby node working mode, and the switch-to-master command notifies to switch from the standby node working mode to the master node working mode.

Based on the foregoing technical solution, an arbitration capability may be integrated into the center system for providing. For example, the center system may determine, based on a fault status of a service channel, whether the standby node needs to switch to the master node working mode, instead of performing detection based on connectivity between a newly added arbitration node and an edge device. Therefore, by integrating a switching capability into the center system, an additional resource waste can be reduced. In addition, whether to switch between the master node and the standby node is determined based on the fault status of the service channel. This can reduce unnecessary switching and save switching time. For example, this embodiment of this disclosure is further applicable to an MEC technology, to resolve a "dual-master" problem and a "no-master" problem that may occur in the MEC technology.

With reference to the third aspect, in some implementations of the third aspect, that a center system monitors a status of a connection between the center system and a first node includes: The center system detects, by remotely logging in to the node by using a secure shell SSH command, whether a connection between the center system and the first node is normal.

According to a fourth aspect, a node control method is provided, applicable to a first node in an edge system. The first node is connected to a center system. The method includes: The first node detects a connection between the first node and the center system; if determining that the first node is in a master node working mode, switches to a standby node working mode when detecting that the connection between the first node and the center system is disconnected; and if determining that the first node is in the standby node working mode, maintains the standby node working mode when detecting that the connection between the first node and the center system is disconnected.

Based on the foregoing technical solution, whether the node needs to be switched to the standby node (in other words, be switched from the original master node to the standby node) is determined through connectivity detection between the node and the center system. This avoids a dual-master problem. For example, the node performs connectivity detection with the center system. When the connectivity detection with the center system fails, the master node may be actively switched to the standby node if the node is a master node. In this manner, not only the dual-master problem can be avoided, but also a case in which it is found that a network is unavailable after switching can be avoided, so that invalid switching time consumption is reduced. For example, this embodiment of this disclosure is further applicable to an MEC technology, to resolve the "dual-master" problem that may occur in the MEC technology.

With reference to the fourth aspect, in some implementations of the fourth aspect, the edge system further includes a second node. The method further includes: The first node detects a connection between the first node and a second node; and when detecting that the connection between the first node and the second node is disconnected, does not perform processing regardless of whether the first node is in the master node working mode or the standby node working mode.

With reference to the fourth aspect, in some implementations of the fourth aspect, that the first node detects a connection between the first node and the center system includes: The first node detects a connection between the first node and a gateway, where the gateway is located between the first node and the center system.

With reference to the fourth aspect, in some implementations of the fourth aspect, the gateway is located within the edge system.

According to a fifth aspect, a node control method is provided, applicable to a first node in an edge system. The method includes: receiving a switch-to-master command from a center system, where the switch-to-master command notifies to switch from a standby node working mode to a master node working mode; and switching to the master node working mode if determining that the first node is in the standby node working mode.

For example, the first node switches to the standby node working mode if determining that the first node is in the master node working mode. For example, when software fails, an original master node and an original standby node need to be switched. To be specific, the center system can be connected to two nodes, and the center system delivers a switch-to-master command (or may be referred to as a switch-to-master command) to the two nodes, so that the node originally in the master node working mode switches to the standby node working mode, and the node originally in the standby node working mode switches to the master node working mode.

Based on the foregoing technical solution, a switch-to-master operation is performed after the node in the standby node working mode receives the switch-to-master command from the center system. That is, service linkage detection may be performed, and an arbitration capability may be integrated into the center system for providing. For example, the center system may determine, based on a fault status of a service channel, whether to switch from the original standby node to the master node, instead of performing detection based on connectivity between an arbitration node and an edge device. Therefore, by integrating a switching capability into the center system, an additional resource waste can be reduced. In addition, whether to switch between the master node and the standby node is determined based on the fault status of the service channel. This can reduce unnecessary switching and save switching time. For example, this embodiment of this disclosure is further applicable to an MEC technology, to resolve a "dual-master" problem and a "no-master" problem that may occur in the MEC technology.

According to a sixth aspect, a node control system is provided. The node control system includes: a first node, a second node, and a center system. The first node and the second node are located in an edge system, and the first node and the second node are both connected to the center system. A current working mode of the first node is a master node working mode, and a current working mode of the second node is a standby node working mode. The first node is configured to: monitor a status of a connection between the first node and the center system, and switch to the standby node working mode when the connection between the first node and the center system is disconnected. The center system is configured to: monitor a status of a connection between the center system and the first node, and send a switch-to-master command to the second node when the connection between the center system and the first node is disconnected, where the switch-to-master command notifies to switch from the standby node working mode to the master node working mode. The second node is configured to switch to the master node working mode based on the switch-to-master command.

With reference to the sixth aspect, in some implementations of the sixth aspect, the first node is further configured to monitor a status of a connection between the first node and the second node; and the first node is further configured to maintain the current working mode of the first node and/or the current working mode of the second node when determining that the connection between the first node and the second node is disconnected or connected.

With reference to the sixth aspect, in some implementations of the sixth aspect, the first node is specifically configured to monitor a status of a connection between the first node and a gateway, where the gateway is located between the first node and the center system.

With reference to the sixth aspect, in some implementations of the sixth aspect, the gateway is located within the edge system.

According to a seventh aspect, a node control apparatus is provided, including the modules or the units configured to perform the method in any possible implementation of the first aspect to the fifth aspect.

According to an eighth aspect, a node control device is provided, including a processor. The processor is coupled to a memory, and may be configured to execute instructions in the memory, to implement the method according to any one of the first aspect to the fifth aspect and the possible implementations of the first aspect to the fifth aspect. Optionally, the device further includes a memory. Optionally, the device further includes a communication interface, the processor is coupled to the communication interface, and the communication interface is configured to input and/or output information. The information includes at least one of the instructions and data.

In an implementation, the device is a node, or the device is a center system. When the device is the node or the center system, the communication interface may be a transceiver or an input/output interface.

In another implementation, the device is a chip or a chip system. When the device is the chip or the chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the device is a chip or a chip system configured in a node, or the device is a chip or a chip system configured in a center system.

Optionally, the transceiver may be a transceiver circuit. Optionally, the input/output interface may be an input/output circuit.

According to a ninth aspect, a processor is provided, including: an input circuit, an output circuit, and a processing circuit. The processing circuit is configured to: receive a signal through the input circuit, and transmit a signal through the output circuit, to enable the processor to perform the method in any possible implementation of the first aspect to the fifth aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, an input interface, the signal output by the output circuit may be, for example, but not limited to, output to the output interface and transmitted by the output interface, and the input circuit and the output circuit may be a same circuit, where the circuit is used as an input circuit and an output circuit at different moments. Specific implementations of the processor and the various circuits are not limited in this embodiment of this disclosure.

According to a tenth aspect, a processing apparatus is provided, including a processor and a memory. The processor is configured to: read instructions stored in the memory, receive a signal through an input interface, and transmit a signal through an output interface, to perform the method in any possible implementation of the first aspect to the fifth aspect. The output interface and the input interface may be collectively referred to as a communication interface.

Optionally, there are one or more processors and one or more memories.

Optionally, the memory may be integrated with the processor, or the memory and the processor are separately disposed.

The processing apparatus according to the tenth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to an eleventh aspect, a computer-readable storage medium is provided. The computer-readable storage medium stores a computer program. When the computer program is executed by a communication apparatus, the communication apparatus is enabled to implement the method according to any one of the first aspect to the fifth aspect and the possible implementations of the first aspect to the fifth aspect.

According to a twelfth aspect, a computer program product including instructions is provided. When the instructions are executed by a computer, an apparatus is enabled to implement the methods according to the first aspect to the fifth aspect.

According to a thirteenth aspect, a node control system is provided, including the first node and the second node described above, or including the first node, the second node, and the center system described above.

DETAILED DESCRIPTION OF ILLUSTRATIVE EMBODIMENTS

The following describes technical solutions of this disclosure with reference to the accompanying drawings.

The technical solutions in embodiments of this disclosure are applicable to various communication systems, for example, a 5th generation (5G) system or a new radio (NR) system, a long term evolution (LTE) system, an LTE frequency division duplex (FDD) system, an LTE time division duplex (TDD) system, and a universal mobile telecommunications system (UMTS).

For ease of understanding embodiments of this disclosure, a network architecture to which embodiments of this disclosure are applicable is first described in detail with reference to FIG. 1 and FIG. 2.

Figure 1:
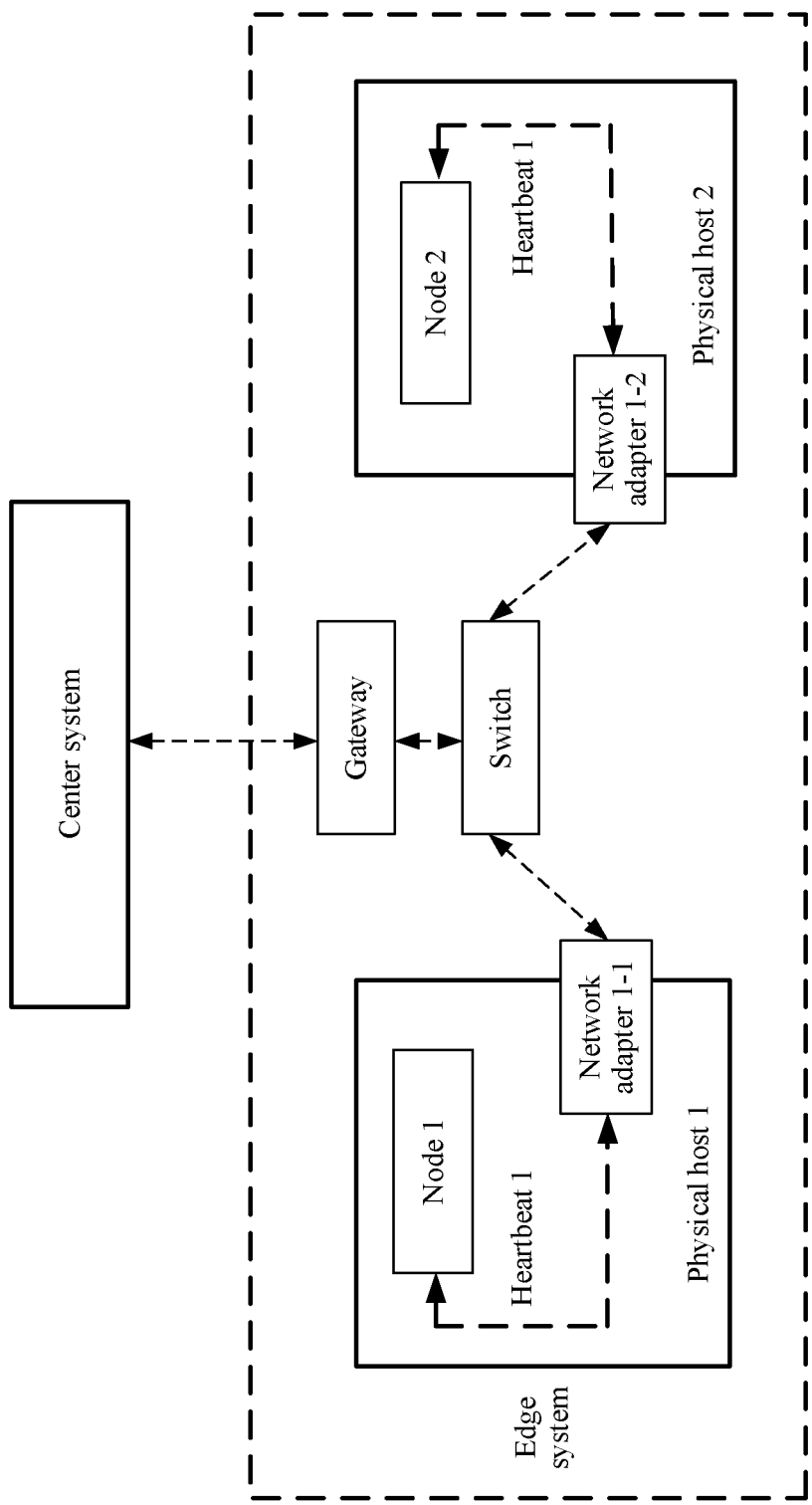
FIG. 1 is a schematic diagram of a network architecture to which an embodiment of this disclosure is applicable.

FIG. 1 is a schematic diagram of a network architecture to which an embodiment of this disclosure is applicable. As shown in FIG. 1, the network architecture may be a two-layer architecture. An upper layer is a center system located in a central area, and a lower layer is an edge system located in each city. The center system may be used as a central controller, and service creation and deletion may be initiated by the center system. In addition, the center system may deliver a request for creating and deleting a service to each edge system, and the edge system creates or deletes the service. In addition, the edge system also has service processing capabilities, such as service query and troubleshooting.

The edge system further includes an edge node. The edge node is a service platform constructed at a network edge close to a user, provides storage, computing, network, and other resources, and sinks some key service applications to an edge of access networks, to reduce width and delay loss caused by network transmission and multi-level forwarding.

The edge node may include one or more nodes. The node is a virtual machine, and includes a system, an application, a database, and the like that are run in the virtual machine. As shown in FIG. 1, the edge node may include, for example, a node 1 and a node 2. The node 1 and the node 2 may be two nodes in a master-standby relationship. Both the node 1 and the node 2 are usually deployed on different physical hosts or different storage devices. If any node fails, another node is not affected and can still continue to run. In most cases, each physical host has only 2 physical network adapters. One (namely, a network adapter 0, not marked in the figure) is used for hardware management, and the other (namely, a network adapter 1) is provided for a virtual machine run on the physical host to use. For example, FIG. 1 shows a network adapter 1-1 and a network adapter 1-2. The network adapter 1-1 is a network adapter 1 on a physical host 1 on which the node 1 is located, and the network adapter 1-2 is a network adapter 1 on a physical host 2 on which the node 2 is located. A heartbeat channel, for example, a heartbeat 1 in FIG. 1, may be configured between the node 1 and the node 2. The node 1 and the node 2 may determine, by detecting the heartbeat channel between the nodes, for example, the heartbeat 1, whether a connection between the nodes is disconnected.

In this embodiment of this disclosure, there is a service connection channel between the edge node and the center system, so that the center system may deliver instructions to the edge node through a management channel. As shown in FIG. 1 or FIG. 2, the center system may deliver instructions to the edge node by using a gateway, a switch, or the like.

Figure 2:
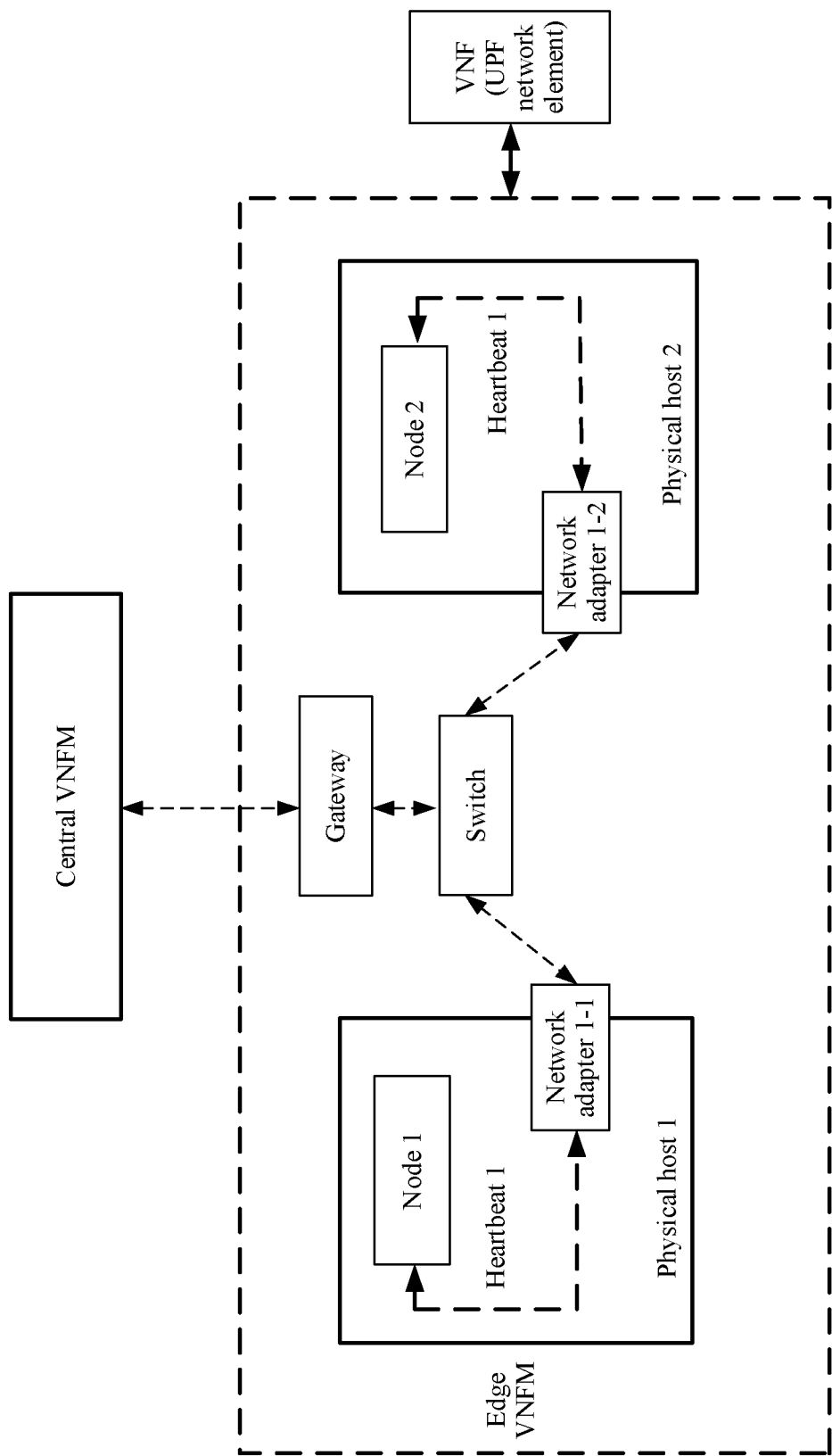
FIG. 2 is a schematic diagram of an application scenario to which an embodiment of this disclosure is applicable.

FIG. 2 is a schematic diagram of an application scenario to which an embodiment of this disclosure is applicable.

This embodiment of this disclosure is applicable to a mobile edge computing (MEC) scenario. For example, the architecture shown in FIG. 1 is applicable to the MEC scenario. As shown in FIG. 2, the center system is a central virtualized network element manager (VNFM) device, and the edge system is an edge VNFM device.

The central VNFM device may cooperate with the edge VNFM device to create a visual network element (VNF). In addition, the VNF may obtain information about virtual resources from the edge VNFM device. The information about the virtual resources may include, for example, but is not limited to, virtual machine information and a network. If the VNF fails, the central VNFM device may cooperate with the edge VNFM device to restore the VNF. For example, as shown in FIG. 2, the VNF may include a user plane function (UPF).

It should be understood that the VNF (a UPF network element) shown in FIG. 2 may be an independent device, or may be integrated into a same device to implement different functions. This is not limited in this disclosure.

It should be further understood that the foregoing names are only used to distinguish between different functions, and do not mean that these network elements are independent physical devices. Specific forms of the foregoing network elements are not limited in this disclosure. For example, the network elements may be integrated into a same physical device, or may be different physical devices. In addition, the foregoing names are only used to distinguish between the different functions, and shall not constitute any limitation on this disclosure. This disclosure does not exclude a possibility of using another name in a 5G network and another future network. For example, in a 6G network, some or all of the foregoing network elements may still use terms in 5G, or may use other names. This is uniformly described herein, and details are not described below again.

It should be further understood that FIG. 1 and FIG. 2 are only examples for description, and the network architecture to which embodiments of this disclosure are applicable is not limited thereto. Any network architecture that can implement functions of the foregoing network elements is applicable to embodiments of this disclosure. For example, the foregoing edge system may include more standby nodes.

It should be further understood that in FIG. 1 and FIG. 2, an example in which a gateway is included in the edge system is used for description. This is not limited. For example, the gateway may alternatively be included in the center system.

To prevent a mobile bearer network from being pipelined, and to be deeply integrated with mobile Internet and Internet of Things services to improve value of mobile network bandwidth, the European Telecommunications Standards Institute (ETSI) proposes an MEC technology based on a 5G evolution architecture. The MEC technology can improve user experience and save bandwidth resources. In addition, the MEC technology provides an infinite possibility for service innovation at a mobile edge entry by sinking a computing capability to a mobile edge node to provide third-party application integration.

After the computing capability is sunk to the mobile edge node, a carrier-class service environment with high performance, low latency, and high bandwidth can be created to accelerate delivery and download of content, services, and applications in the network, so that consumers can enjoy a higher-quality network experience.

An orchestration capability of a VNFM is indispensable to both MEC in the fourth generation of mobile phone mobile communication technology standards (the fourth generation of mobile phone mobile communication technology standards) and MEC in 5G; and the VNFM also needs to adapt to service requirements of the MEC.

A VNFM "dual-master" problem is used as an example. The "dual-master" problem indicates a phenomenon that two machines or two nodes in a master-standby relationship both change to master nodes under a specific condition. When this phenomenon occurs, the two nodes process a same service as the master nodes. As a result, service processing results on the two nodes may be inconsistent. Therefore, a dual machine in a master-standby mode needs to avoid this case as much as possible. It may be understood that a "no-master" problem indicates a phenomenon that two machines or two nodes in a master-standby relationship both change to standby nodes under a specific condition.

The node 1 and the node 2 in FIG. 1 or FIG. 2 are used as an example. Both the node 1 and the node 2 in the dual machine in the master-standby mode are usually deployed on different physical hosts or different storage devices. If any node fails, another node is not affected and can still continue to run.

In a conventional technology, the "dual-master" problem is resolved in the following two manners.

In one manner, the "dual-master" problem is avoided by detecting a heartbeat channel between the nodes. The architecture shown in FIG. 2 is used as an example. A plurality of heartbeat channels are configured between the node 1 and the node 2. Specifically, the dual-master phenomenon does not occur provided that one heartbeat channel can be still connected. In other words, the master node is still the master node, and the standby node is still the standby node. When no heartbeat channel can be connected, the standby node is switched to the master node.

In this manner, a hardware fault or a software fault causes the "dual-master" problem. For example, the hardware fault causes the "dual-master" problem. In a virtualization scenario, a virtual network adapter through which a plurality of heartbeat channels on a same node pass actually corresponds to a same physical network adapter (for example, the network adapter 1 in FIG. 2) in a physical host. It is assumed that the node 1 is the master node and the node 2 is the standby node. When a network adapter of the physical host fails, the physical host fails, or a network device fails, the node 2 cannot detect a heartbeat of the node 1, and the node 2 is switched to the master node. As a result, the "dual-master" phenomenon occurs. For another example, the software fault causes the "dual-master" problem. When the master node or the standby node cannot detect a heartbeat of a peer end due to an internal software fault (a fault not caused by a factor such as a network adapter or a network), the "dual-master" problem occurs. Even if the plurality of heartbeat channels are configured, the dual-master problem in this scenario cannot be resolved.

In the other manner, the "dual-master" problem is avoided by adding an arbitration node. The arbitration node is added in two manners. In one manner, the arbitration node is added to each edge system, and performs nearby arbitration. In other words, the arbitration node added to each edge system determines which node of the edge system is a host. In the other manner, the arbitration node is added to a position that is the same as the central VNFM device, and the added arbitration node determines which node of each edge system is a host.

In this manner, additional resources are added, for example, a computing resource, a storage resource, and a network resource are all added. In addition, if an arbitration node and a node are located on a same physical board, a single point of failure on the physical board causes a failure of both the arbitration node and the node, and a remaining node cannot be switched to a master node due to a lack of arbitration. The "no-master" phenomenon is formed, and finally, the entire service is unavailable.

In view of this, this disclosure provides a manner, to resolve the "dual-master" problem at low costs, and avoid the "no-master" problem.

The following describes in detail embodiments provided in this disclosure with reference to the accompanying drawings.

Figure 3:
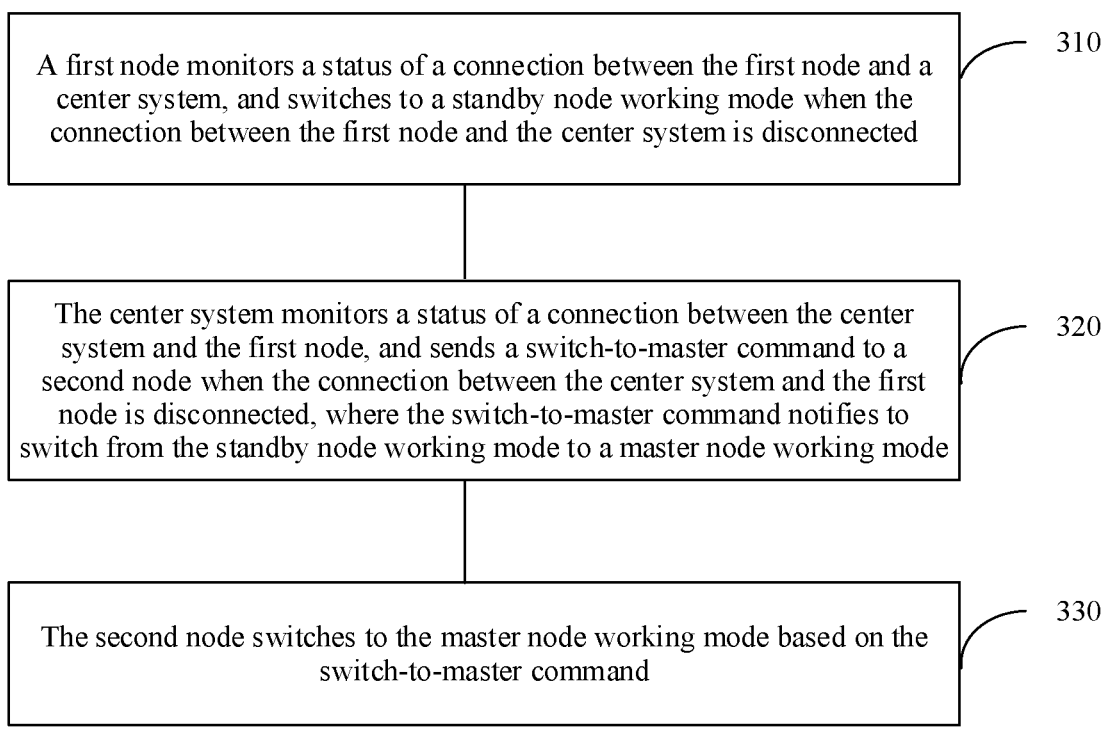
FIG. 3 is a schematic block diagram of a node control method according to an embodiment of this disclosure.

FIG. 3 is a schematic block diagram of a node control method 300 according to an embodiment of this disclosure. The method 300 is applicable to a node control system. The node control system includes: a first node, a second node, and a center system. The first node and the second node are located in an edge system, and the first node and the second node are both connected to the center system.

The center system is a device that may control the edge system in which the first node and the second node are located. For example, the center system may be used as a central controller to initiate service creation and deletion. In addition, the center system may deliver a request for creating and deleting a service to each edge system, and the edge system creates or deletes the service.

For example, the center system may be the center system shown in FIG. 1, or the center system may be the central VNFM device shown in FIG. 2. A specific form of the center system is not limited in this embodiment of this disclosure.

It should be understood that the center system is only a name for distinguishing between different functions, and the name of the center system does not limit the protection scope of embodiments of this disclosure. In a future protocol, names indicating a same function all fall within the protection scope of embodiments of this disclosure.

It is assumed that a current working mode of the first node is a master node working mode, and a current working mode of the second node is a standby node working mode. The method 300 may include the following steps.

310: The first node monitors a status of a connection between the first node and the center system, and switches to the standby node working mode when the connection between the first node and the center system is disconnected.

320: The center system monitors a status of a connection between the center system and the first node, and sends a switch-to-master command to the second node when the connection between the center system and the first node is disconnected, where the switch-to-master command notifies to switch from the standby node working mode to the master node working mode.

330: The second node switches to the master node working mode based on the switch-to-master command.

According to this embodiment of this disclosure, a switch-to-standby operation is performed when the node in the master node working mode detects that the connection between the node and the center system is disconnected; and a switch-to-master operation is performed after the node in the standby node working mode receives the switch-to-master command from the center system. Specifically, whether the node in the master node working mode needs to be switched to a standby node (in other words, be switched from an original master node to a standby node) is determined through connectivity detection between the node in the master node working mode and the center system. This avoids a dual-master problem. In this manner, not only the dual-master problem can be avoided, but also a case in which it is found that a network is unavailable after switching can be avoided, so that invalid switching time consumption is reduced. In addition, a no-master problem can be avoided by integrating an arbitration capability into the center system. For example, the center system may deliver the switch-to-master command to the node in the standby node working mode, so that the original standby node switches to the master node working mode. Therefore, there is no need to add a new arbitration node. Instead, a switching capability is integrated into the center system. This can reduce an additional resource waste, and avoid the no-master problem. In addition, the center system may determine, based on a status of a connection between the center system and the node in the master node working mode, whether to deliver the switch-to-master command. This can reduce unnecessary switching and save switching time.

The first node and the second node are nodes in the edge device or the edge system, and the edge device or the edge system may include a plurality of nodes. For example, the edge device or the edge system may include two nodes, denoted as a first node and a second node. Alternatively, the edge device or the edge system may include at least two nodes. For example, one node is in the master node working mode, and a plurality of other nodes are in the standby node working mode. This is not limited. The method 300 is mainly described by using an example in which it is assumed that the first node is in the master node working mode and the second node is in the standby node working mode.

It should be understood that a specific form of the nodes, for example, the first node and the second node, are not limited in this embodiment of this disclosure. For example, the node may be a virtual machine, and includes a system, an application, and a database that are run in the virtual machine. The application may include, for example, a management application and a service application.

It should be understood that the standby node is relative to the master node and may also be referred to as a slave node or a non-master node, and a name of the standby node does not limit the protection scope of embodiments of this disclosure. In a future protocol, names indicating a same function all fall within the protection scope of embodiments of this disclosure.

It should be further understood that a status of the node is not limited in this embodiment of this disclosure. The first node is used as an example. The first node is currently in a master node state, and may be in a standby node state in a period of time. This does not limit that the first node can be only the master node.

The master node, or a node being the master node, or a node being in the master node working mode indicates a same meaning, and a person skilled in the art should understand the meaning. The standby node, or a node being the standby node, or a node being in the standby node working mode indicates a same meaning, and a person skilled in the art should understand the meaning. The following uniformly uses the master node and the standby node for description.

In an example, whether a node is the master node or the standby node may be determined based on a status of the node. For example, the master node is a node in an active state, and the standby node is a node in an inactive state. It may be understood that if a node is in the active state, it is determined that the node is the master node. If a node is in the inactive state, it is determined that the node is the standby node.

The active state may indicate, for example, whether an external service may be provided. In other words, the master node provides the external service. For example, when the edge system is installed, one node may be set as the master node by default, another node is set as the standby node. The master node provides the external service.

In another example, whether a node is the master node or the standby node may be determined based on a state of a service application on the node. For example, a system, a management application, a service application, and a database on the master node may all be in a running state; and a system, a management application, and a database on the standby node may be in the running state, and a service application is in a stopped state. It may be understood that if the service application on the node is in the running state, it is determined that the node is the master node. If the service application on the node is in a non-running state or the stopped state, it is determined that the node is the standby node. It should be understood that, that the service application on the standby node is definitely in the stopped state is not limited in this embodiment of this disclosure. For example, in a hot standby mode, the systems, the management applications, the service applications, and the databases on the master node and the standby node may all be in the running state.

In still another example, whether a node is the master node or the standby node may be determined based on an identifier. The master node and the standby node may be identified by recording a flag. For example, when the edge system is installed, a flag file (namely, a file including a standby state flag, such as standby_flag) may be created in a preset storage path on a node, to identify the node as the standby node, and a node without the flag file is the master node. It may be understood that an example in which the flag is standby_flag is used. If a file including the flag standby_flag exists on a node, it is determined that the node is the standby node; or if the file including the flag does not exist on the node, it is determined that the node is the master node. It should be understood that there are many manners of identifying the master node or the standby node by using the identifier. Details are not described herein again. Any other manner of identifying the master node or the standby node by using the identifier falls within the protection scope of embodiments of this disclosure.

It should be understood that the foregoing examples are only examples for description, and any manner that can be used to determine whether the node is the master node or the standby node falls within the protection scope of embodiments of this disclosure.

A person skilled in the art should understand a meaning of "switching to the standby node working mode", "switching from the master node to the standby node", or "switching to the standby node" mentioned for a plurality of times in this embodiment of this disclosure. The meanings all mean that a node switches from the original master node mode to the standby node mode; or a node starts to process a service as the standby node; or it may be understood that in the edge system, a node starts to exist as the standby node, for example, the node does not process a service temporarily (for example, the node stops all applications on the node). Details are not described again below.

A person skilled in the art should understand a meaning of "switching to the master node working mode", "switching from the standby node to the master node", or "switching to the master node" mentioned for a plurality of times in this embodiment of this disclosure. The meanings all mean that a node switches from the original standby node mode to the master node mode; or a node starts to process a service as the master node; or it may be understood that in the edge system, a node starts to exist as the master node, for example, the master node starts to process a service. Details are not described again below.

It may be understood that each node manages an application to control a communication channel for externally accessing to the edge system, and may record a master-standby mode. When a switch-to-master operation or a switch-to-standby operation is performed, the master-standby mode is updated.

Optionally, the first node may detect a connection between the first node and a gateway, to determine the status of the connection between the first node and the center system.

For example, when detecting that the connection between the first node and the gateway is disconnected, the first node determines that the status of the connection between the first node and the center system is disconnected; or when detecting that the connection between the first node and the gateway is connected, the first node determines that the status of the connection between the first node and the center system is connected. The following mainly uses an example in which the connection between the node and the gateway is detected for description. It should be understood that any manner that can be used to determine connectivity between the node and the center system is applicable to this embodiment of this disclosure.

For example, the gateway may be located in the edge system, for example, as shown in FIG. 1 or FIG. 2; or the gateway may be located in the center system. This is not limited.

It should be understood that a specific form of the gateway is not limited in this embodiment of this disclosure. For example, the gateway may be an inter-network connector or a network device in a switch. Alternatively, the gateway may be an inter-network connector or a network device in a routing device. The connection between the gateway and the node may mean that the node is connected to the gateway to run. For example, the node is connected to the gateway to run an application such as a program or a database.

Optionally, an occasion of detection between the node and the center system (for example, the gateway) is not limited in this embodiment of this disclosure.

In a possible implementation, the first node may periodically detect the connection between the first node and the center system. Alternatively, the first node may regularly detect the connection between the first node and the center system. For example, after the system is started, the first node may periodically detect the connection between the first node and the center system.

For example, the first node periodically detects the connection between the first node and the center system based on a first preset time.

The first preset time may be, for example, configured duration; or the first preset time may be predefined duration, for example, duration predefined in a protocol or pre-specified by the center system; or the first preset time may be duration determined based on a historical detection status. This is not limited.

For example, the first preset time may be one minute. To be specific, the first node may detect the connection between the first node and the center system every minute.

It should be understood that the first node may alternatively irregularly detect the connection between the first node and the center system. This is not limited in this embodiment of this disclosure.

Optionally, a manner of detection between the node and the center system (for example, the gateway) is not limited in this embodiment of this disclosure.

In a possible implementation, the first node may determine, by sending a message, whether the connection between the first node and the center system is normal. For example, the first node sends a message (for example, a heartbeat message or a heartbeat signal) to the center system. If receiving a message (for example, an acknowledge (ACK) message) returned by the center system, the first node may determine that the connection between the first node and the center system is normal. If the first node does not receive the message returned by the center system, the first node may determine that the connection between the first node and the center system is abnormal.

In another possible implementation, the first node may detect, by pinging a gateway IP address, whether the connection between the first node and the center system (for example, the gateway) is normal.

For example, if a result of a ping command returns 0, the connection between the first node and the center system (for example, the gateway) is normal. If a result of the ping command returns another value, the connection between the first node and the center system (for example, the gateway) fails (or the connection is disconnected).

For example, related parameters of the ping command may include, but are not limited to, a specified quantity of times of continuous execution, a time interval of executing ping each time, and an execution timeout time.

The specified quantity of times of continuous execution may be, for example, a quantity of times of continuous execution, for example, a quantity of times of continuously executing detection by pinging the gateway IP address. The specified quantity of times of continuous execution may be configured, or may be predefined. This is not limited. For example, the quantity of times of continuous execution may be set to A, where A is an integer greater than 1 or equal to 1. For example, if A is 5, the quantity of times of continuous execution is 5.

The time interval of executing ping each time may be, for example, a time interval of executing ping twice consecutively, for example, a time interval of executing detection by pinging the gateway IP address twice consecutively. The time interval of executing ping each time may be configured, or may be predefined. This is not limited. For example, the time interval of executing ping each time may be T1 by default, where T1 is a number greater than 0. For example, if a value of T1 is one second, the time interval of executing ping each time is one second.

The execution timeout time may be, for example, timeout time for executing ping. The execution timeout time may be configured, or may be predefined. This is not limited. For example, the execution timeout time may be T2 by default, where T2 is a number greater than o. For example, if a value of T2 is four seconds, the execution timeout time is four seconds.

It should be understood that the foregoing manner is only an example for description, and any manner that can be used by the node to detect the connection between the node and the center system falls within the protection scope of embodiments of this disclosure.

As described above, in this embodiment of this disclosure, the center system may alternatively detect a status of a connection between the center system and the first node. The manner of detection between the center system and the node is not limited in this embodiment of this disclosure.

In a possible implementation, the center system may detect, by remotely logging in to the node by using a secure shell (SSH) command, whether a connection between the center system and an edge node (for example, the first node) is normal. If a result of the SSH command returns 0, it indicates that the connection between the center system and the edge node (for example, the first node) is normal. If a result of the SSH command returns another value, it indicates that the connection between the center system and the edge node (for example, the first node) fails.

It should be understood that the manner in which the center system detects whether the connection between the center system and the edge node (for example, the first node) is normal is not limited in this embodiment of this disclosure. Any manner that can be used by the center system to detect whether the connection between the center system and the edge node is normal falls within the protection scope of embodiments of this disclosure. For example, the center system may detect, in the ping manner described above, whether the connection between the center system and the edge node is normal. For another example, the center system may alternatively determine, by sending a message to the edge node, whether the connection is normal.

An occasion of detection between the center system and the edge node (for example, the first node) is not limited in this embodiment of this disclosure.

For example, after the center system receives error code "unavailable", the center system may detect whether the connection between the center system and the edge node (for example, the first node) is normal. In a possible case, when the edge device is in a "no-master state", programs on all nodes are all stopped. As a result, an established channel between the center system and the edge device, for example, an established channel developed based on a Google remote procedure call (RPC) (gRPC) framework, is forcibly disconnected, and consequently the center system receives the error code "unavailable".

It should be understood that in this embodiment of this disclosure, the "no-master state" mentioned for a plurality of times means that a plurality of nodes are all the standby nodes or are all in the standby node working mode, and there is no master node. Alternatively, the nodes in the edge system are all the standby nodes or are all in the standby node working mode, and there is no master node. For example, the programs on all the nodes in the edge system are stopped.

The gRPC channel means that the gRPC framework is used for communication between the center system and the edge device, and a protocol is HTTP/2 (Hypertext Transfer Protocol (HTTP)). After the communication between the center system and the edge device is established, the communication channel always exists. It should be understood that the gRPC channel is only an example for description. That only the gRPC channel may be used for the communication between the center system and the edge device is not limited in this embodiment of this disclosure.

When the center system detects that a service connection channel between the center system and the edge device (or the edge system) in which the first node is located is disconnected, the center system may deliver a switch-to-master command to the edge device. Correspondingly, the second node receives the switch-to-master command.

It should be understood that when there are a plurality of nodes in the standby node working mode in the edge system, the center system may send the switch-to-master command to any one of the nodes.

The switch-to-master command notifies to switch from the standby node working mode to the master node working mode. In other words, the switch-to-master command indicates to switch to the master node working mode, or the switch-to-master command indicates to switch from the original standby node to the master node working mode. It should be understood that the switch-to-master command is only a name for distinguishing between different functions, and the name does not limit the protection scope of embodiments of this disclosure. The switch-to-master command may also be referred to as, for example, a switching instruction, a force-to-switch-to-master command, or a forced command. Alternatively, for the master node, the switch-to-master command may be replaced with a switch-to-standby command. In a future protocol, names used to represent a same function all fall within the protection scope of embodiments of this disclosure. The following uniformly uses the switch-to-master command for description.

The center system delivers a switch-to-master command to the second node, or the center system delivers, to the second node, a command for switching the second node from the standby node to the master node. After receiving the switch-to-master command, the second node switches from the standby node to the master node based on the switch-to-master command. For example, after an application is started, the edge device may actively establish a gRPC connection between the edge device and the center system. After a gRPC channel is successfully established, a switch-to-master process ends.

Optionally, in this embodiment of this disclosure, detection may alternatively be performed between the nodes.

For example, the first node monitors a status of a connection between the first node and the second node; and maintains the current working mode of the first node when determining that the connection between the first node and the second node is disconnected or connected.

For another example, the second node monitors a status of a connection between the second node and the first node; and maintains a current working mode of the second node when determining that the connection between the second node and the first node is disconnected or connected.

It should be understood that regardless of whether the connection between the first node and the second node fails, both the first node in the master node working mode and the second node in the standby node working mode do not perform processing, or maintain the current modes.

In this embodiment of this disclosure, whether the master node is subject to the switch-to-standby operation is determined based on the detection between the nodes, for example, heartbeat detection, in combination with the detection between the node and the center system (for example, the gateway). This avoids the dual-master problem. In addition, the node determines, based on the connection between the node and the center system, whether to be switched to the standby node. Therefore, even if hardware fails (for example, a network adapter of a physical host fails, a physical host fails, or a network device fails), or the master node or the standby node cannot detect a heartbeat of a peer end due to an internal software fault (a fault not caused by a factor such as a network adapter or a network), the dual-master problem caused by misjudgment does not occur.

Conversely, if the node detects that the connection between the nodes fails, and the standby node is switched to the master node, the dual-master problem may occur. For example, a hardware fault (for example, a network adapter fault of a physical host, a physical host fault, or a network device fault) or a software fault (for example, an internal software fault not caused by a factor such as a network adapter or a network) may cause a fault that is of the connection between the nodes and that is detected by the node. In this case, if the standby node is switched to the master node, two master nodes: the node in the master node state and the node switched from the standby node to the master node (namely, the dual-master problem) may occur. Therefore, in this embodiment of this disclosure, after the node detects that the connection between the nodes fails, no action is performed regardless of whether the node is the master node or the standby node. This avoids the dual-master problem.

Optionally, an occasion of the detection between the nodes is not limited in this embodiment of this disclosure. The following mainly uses detection performed by the first node as an example for description.

In a possible implementation, the first node may periodically detect the connection between the first node and the second node. Alternatively, the first node may regularly detect the connection between the first node and the second node. For example, after the system is started, the first node may periodically detect the connection between the first node and the second node.

For example, the first node periodically detects the connection between the first node and the second node based on a second preset time.

The second preset time may be, for example, configured duration; or the second preset time may be predefined duration, for example, duration predefined in a protocol or pre-specified by the center system; or the second preset time may be duration determined based on a historical detection status. This is not limited. The first preset time may be the same as or different from the second preset time, and there may be a relationship or no relationship between the first preset time and the second preset time. This is not limited.

For example, the second preset time may be one minute. To be specific, the first node may detect the connection between the first node and the second node every minute.

It should be understood that the first node may alternatively irregularly detect the connection between the first node and the second node. This is not limited in this embodiment of this disclosure.

Optionally, a manner of detection between the nodes is not limited in this embodiment of this disclosure.

In a possible implementation, the connection between the nodes is detected by sending a message (for example, a heartbeat signal). For example, provided that the first node may detect a heartbeat of the second node, it may be considered that the connection between the first node and the second node is normal. When no heartbeat channel may be connected, it may be considered that the connection between the first node and the second node is abnormal.

In another possible implementation, the first node may detect, by pinging a gateway IP address, whether the connection between the first node and the second node is normal.

For example, if a result of a ping command returns 0, the connection between the first node and the second node is normal. If a result of the ping command returns another value, the connection between the first node and the second node fails (or the connection is disconnected).

For example, related parameters of the ping command may include, but are not limited to, a specified quantity of times of continuous execution, a time interval of executing ping each time, and an execution timeout time.

The specified quantity of times of continuous execution may be, for example, a quantity of times of continuous execution, for example, a quantity of times of continuously executing detection by pinging the gateway IP address. The specified quantity of times of continuous execution may be configured, or may be predefined. This is not limited. For example, the quantity of times of continuous execution may be set to B, where B is an integer greater than 1 or equal to 1. For example, if B is 5, the quantity of times of continuous execution is 5. B and A may be the same or may be different, and there may be a relationship or no relationship between B and A. This is not limited.

The time interval of executing ping each time may be, for example, a time interval of executing ping twice consecutively, for example, a time interval of executing detection by pinging the gateway IP address twice consecutively. The time interval of executing ping each time may be configured, or may be predefined. This is not limited. For example, the time interval of executing ping each time may be t1 by default, where t1 is a number greater than 0. For example, if a value of t1 is one second, the time interval of executing ping each time is one second. t1 and T1 may be the same or may be different, and there may be a relationship or no relationship between t1 and T1. This is not limited.

The execution timeout time may be, for example, timeout time for executing ping. The execution timeout time may be configured, or may be predefined. This is not limited. For example, the execution timeout time may be t2 by default, where t2 is a number greater than 0. For example, if a value of t2 is four seconds, the execution timeout time is four seconds. t2 and T2 may be the same or may be different, and there may be a relationship or no relationship between t2 and T2. This is not limited.

It should be understood that the foregoing manner is only an example for description, and any manner that can be used by the node to detect the connection between the nodes falls within the protection scope of embodiments of this disclosure. For example, between the nodes, whether the connection between the nodes is normal may be determined by detecting a heartbeat channel between the nodes. For example, the heartbeat channel between the nodes may be detected by sending a heartbeat signal.

It should be further understood that there is no strict sequence between the steps. For example, step 320 and step 330 are performed before step 310. To be specific, the second node may first receive the switch-to-master command from the center system, and perform corresponding processing based on the switch-to-master command. Alternatively, step 310 is performed before step 320 and step 330. To be specific, the first node may alternatively first perform corresponding processing based on the status of the connection between the first node and the center system.

In the foregoing method 300, the current working modes of the first node and the second node are assumed. For generality, the following uses a node #1 as an example for description.

Figure 4:
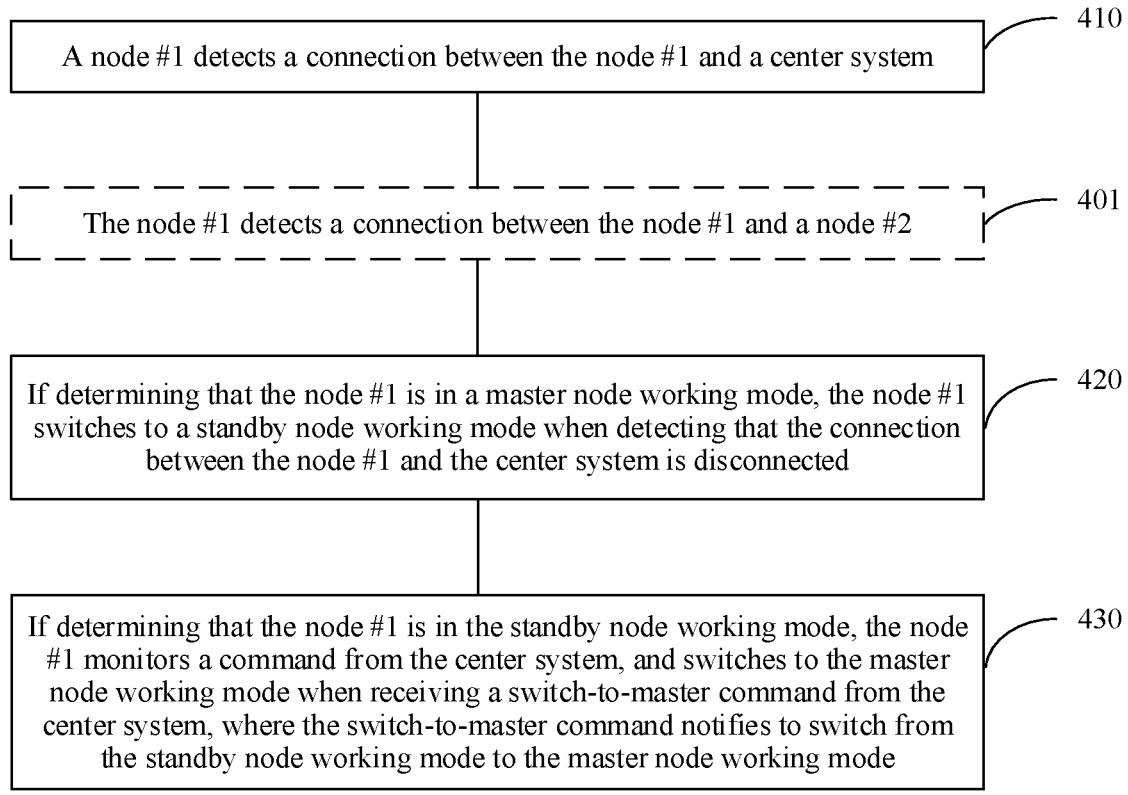
FIG. 4 is a schematic block diagram of a node control method according to another embodiment of this disclosure.

FIG. 4 is a schematic block diagram of a node control method 400 according to an embodiment of this disclosure. The method 400 may include the following steps.

410: A node #1 detects a connection between the node #1 and a center system.

For example, the node #1 may be a master node, or the node #1 is in a master node working mode; or the node #1 may be a standby node, or the node #1 is in a standby node working mode.

It should be understood that when the node #1 is the standby node, the node #1 may not need to detect the connection between the node #1 and the center system. This is not limited.

In a possible implementation, the node #1 detects a connection between the node #1 and a gateway. For details, refer to the descriptions of detecting, by the first node, the connection between the first node and the gateway in the foregoing method 300. Details are not described herein again.

420: If determining that the node #1 is in a master node working mode, the node #1 switches to a standby node working mode when detecting that the connection between the node #1 and the center system is disconnected.

In one case, the node #1 is the master node. If the node #1 detects that the connection between the node #1 and the center system fails, or the node #1 detects that the connection between the node #1 and the center system is disconnected, the node #1 switches from the master node working mode to the standby node working mode, or the node #1 switches to the standby node. For example, the node #1 may stop applications such as a program and a database on the node #1.

In another case, the node #1 is the standby node. If the node #1 detects that the connection between the node #1 and the center system fails, or the node #1 detects that the connection between the node #1 and the center system is disconnected, the node #1 maintains the standby node working mode, or the node #1 maintains the standby node unchanged.

430: If determining that the node #1 is in the standby node working mode, the node #1 monitors a command from the center system, and switches to the master node working mode when receiving a switch-to-master command from the center system, where the switch-to-master command notifies to switch from the standby node working mode to the master node working mode.

When the node #1 does not detect that the connection between the node #1 and the center system fails, or the connection between the node #1 and the center system is not disconnected, the node #1 may receive the switch-to-master command delivered by the center system.

In a possible implementation, when the center system detects that a service connection channel between the center system and an edge device (or an edge system) in which the node #1 is located is disconnected, the center system may deliver the switch-to-master command to the edge device through a management channel.

It may be understood that the center system may determine, based on a service status, whether to send the switch-to-master command.

For example, the center system may detect whether a connection between the center system and a node (for example, a node currently in the master node working mode) of the edge device is normal. When the center system detects that the connection between the center system and the node currently in the master node working mode is disconnected, the center system may deliver the switch-to-master command to the node currently in the standby node working mode.

For a manner of detection between the center system and the node, refer to the descriptions in the method 300. Details are not described herein again.

When the center system detects that the service connection channel between the center system and the edge device (or the edge system) in which the node #1 is located is disconnected, the center system may deliver the switch-tomaster command to the edge device. Correspondingly, the node of the edge device receives the switch-to-master command.

In one case, the node #1 is the master node, or the node #1 is in the master node working mode. In this case, because the service connection channel between the center system and the edge device (or the edge system) in which the node #1 is located is disconnected, in other words, all programs on the node #1 are stopped or it may be understood that the node #1 is already in the standby node working mode, the node #1 does not receive the switch-to-master command.

In another case, the node #1 is the standby node, or the node #1 is in the standby node working mode. In this case, the center system delivers the switch-to-master command to the node #1, or the center system delivers, to the node #1, a command for switching the node #1 from the standby node to the master node. After receiving the switch-to-master command, the node #1 switches from the standby node to the master node based on the switch-to-master command. For example, after an application is started, the edge device may actively establish a gRPC connection between the edge device and the center system. After a gRPC channel is successfully established, a switch-to-master process ends.

In this embodiment of this disclosure, connectivity detection may be performed. Whether the node needs to be switched to the standby node (in other words, be switched from the original master node to the standby node) is determined through connectivity detection between the node and the center system (for example, the gateway). This avoids a dual-master problem. In this manner, not only the dual-master problem can be avoided, but also a case in which it is found that a network is unavailable after switching can be avoided, so that invalid switching time consumption is reduced. In addition, service linkage detection may be performed. A no-master problem can be avoided by integrating an arbitration capability into the center system. For example, the center system may deliver the switch-to-master command to the node in the standby node working mode, so that the original standby node switches to the master node working mode. Therefore, there is no need to add a new arbitration node. Instead, a switching capability is integrated into the center system. This can reduce an additional resource waste, and avoid the no-master problem.

It should be understood that the foregoing steps are only examples for description, and this embodiment of this disclosure is not limited thereto. For example, when the current working mode of the node #1 is the standby node working mode, only step 430 may be performed. For another example, when the current working mode of the node #1 is the master node working mode, only step 410 and step 420 may be performed.

It should be further understood that there is no strict sequence between determining, by the node #1, whether the node #1 is in the master node working mode or the standby node working mode and detecting, by the node #1, whether the connection between the node #1 and the center system is disconnected. For example, the node #1 may determine whether the node #1 is in the master node working mode or the standby node working mode, and then detect whether the connection between the node #1 and the center system is disconnected; or the node #1 may detect whether the connection between the node #1 and the center system is disconnected, and then determine whether the node #1 is in the master node working mode or the standby node working mode.

Optionally, the method 400 may further include step 401.

401: The node #1 detects a connection between the node #1 and a node #2.

For example, the node #1 is the master node, and the node #2 is the standby node; or the node #1 is the standby node, and the node #2 is the master node.

It should be understood that regardless of whether the connection between the node #1 and the node #2 fails, both the node #1 and the node #2 do not perform processing, or maintain the current modes.

For detection between the nodes, refer to the foregoing descriptions in the method 300. Details are not described herein again.

It should be understood that there is no sequence between step 401 and step 410. For example, after the system is started, the node #1 may regularly detect the connection between the node #1 and the node #2, and the node #1 may regularly detect a connection between the node #1 and the gateway.

The foregoing describes a solution of the connectivity detection (for example, step 410 and step 420) in combined with the service linkage detection (for example, step 430) with reference to the method 300 and the method 400. By using the solution, both the no-master problem and the dual-master problem can be resolved. The following separately describes a solution of the connectivity detection and a solution of the service linkage detection with reference to FIG. 5 and FIG. 6. It should be understood that the solutions in the method 500 and the method 600 may be used in combination (for example, as described in the method 300 or the method 400), or may be independently used. This is not limited.

Figure 5:
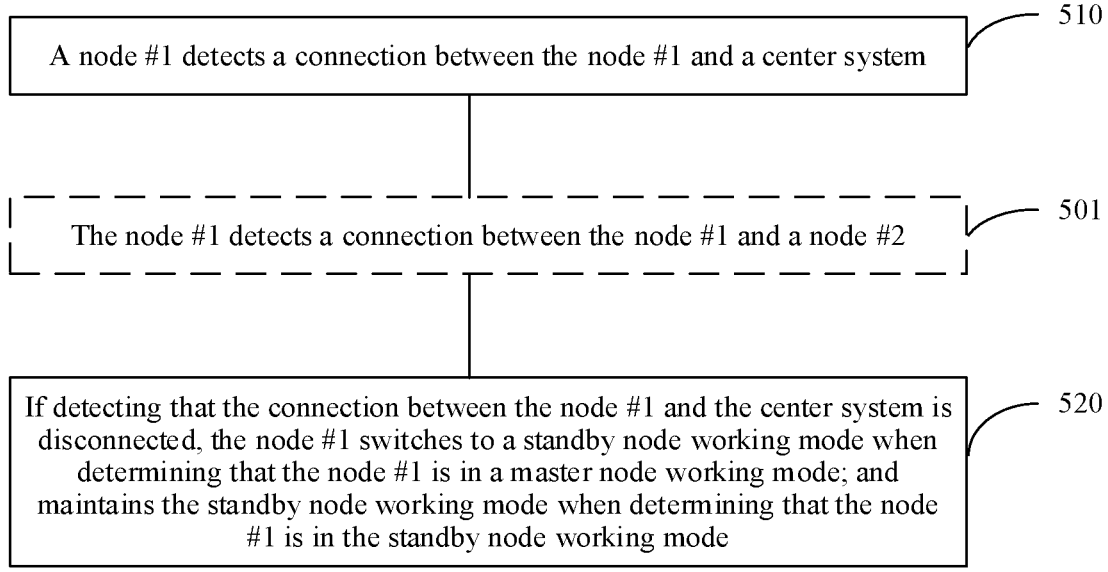
FIG. 5 is a schematic block diagram of a node control method according to still another embodiment of this disclosure.

FIG. 5 is a schematic block diagram of a node control method 500 according to an embodiment of this disclosure. The method 500 may include the following steps.

510: A node #1 detects a connection between the node #1 and a center system.

For example, the node #1 may be a master node, or the node #1 is in a master node working mode; or the node #1 may be a standby node, or the node #1 is in a standby node working mode.

For an occasion and a manner of detection between the node and the center system, refer to the descriptions in the method 300. Details are not described herein again.

520: If detecting that the connection between the node #1 and the center system is disconnected, the node #1 switches to the standby node working mode when determining that the node #1 is in the master node working mode; and maintains the standby node working mode when determining that the node #1 is in the standby node working mode.

In a possible implementation, the node #1 may detect a connection between the node #1 and a gateway. To be specific, if detecting that the connection between the node #1 and the gateway is disconnected, the node #1 switches to the standby node working mode when determining that the node #1 is in the master node working mode; and maintains the standby node working mode when determining that the node #1 is in the standby node working mode.

For a solution of detection between the node and the gateway, refer to the descriptions in the method 300. Details are not described herein again.

In one case, the node #1 is the master node, or the node #1 is in the master node working mode. If the node #1 detects that the connection between the node #1 and the center system fails, or the node #1 detects that the connection between the node #1 and the center system is disconnected, the node #1 switches from the master node working mode to the standby node working mode, or the node #1 switches to the standby node. For example, the node #1 may stop applications such as a program and a database on the node #1.

In another case, the node #1 is the standby node, or the node #1 is in the standby node working mode. If the node #1 detects that the connection between the node #1 and the center system fails, or the node #1 detects that the connection between the node #1 and the center system is disconnected, the node #1 maintains the standby node working mode, or the node #1 maintains the standby node unchanged.

In this embodiment of this disclosure, whether the node needs to be switched to the standby node (in other words, be switched from the original master node to the standby node) is determined through connectivity detection between the node and the center system (for example, the gateway). This avoids a dual-master problem. For example, when the connectivity detection fails, to be specific, the master node detects that the connection between the master node and the center system fails or is disconnected, a switch-to-standby operation may be actively performed on the node, in other words, the master node may be actively switched to the standby node. In this manner, not only the dual-master problem can be avoided, but also a case in which it is found that a network is unavailable after switching can be avoided, so that invalid switching time consumption is reduced.

Optionally, the method 500 may further include step 501.

501: The node #1 detects a connection between the node #1 and a node #2.

It should be understood that regardless of whether the connection between the node #1 and the node #2 fails, both the node #1 and the node #2 do not perform processing, or maintain the current modes.

For a solution of detection between the nodes, refer to the descriptions in the method 300. Details are not described herein again.

It should be understood that there is no sequence between step 501 and step 510. For example, after the system is started, the node #1 may regularly detect the connection between the node #1 and the node #2, and the node #1 may regularly detect a connection between the node #1 and the center system.

It should be further understood that in the method 500, a condition for triggering the standby node to be switched to the master node, for example, a time when the standby node is switched to the master node, is not limited. Any solution in which there is one master node (for example, a master node switched from the standby node) in the edge system after the master node is switched to the standby node is applicable to this embodiment of this disclosure.

Based on the foregoing technical solution, whether the node needs to be switched to the standby node (in other words, be switched from the original master node to the standby node) is determined through connectivity detection between the node and the center system. This avoids a dual-master problem. Alternatively, whether the node needs to be switched to the standby node is determined with reference to the detection between the nodes and the detection between the node and the center system. This avoids a dual-master problem. For example, when the connectivity detection with the center system fails, to be specific, the master node detects that the connection between the master node and the center system fails or is disconnected, a switch-to-standby operation may be actively performed on the node, in other words, the master node may be actively switched to the standby node. In this manner, not only the dual-master problem can be avoided, but also a case in which it is found that a network is unavailable after switching can be avoided, so that invalid switching time consumption is reduced. For example, this embodiment of this disclosure is further applicable to an MEC technology, to resolve the "dual-master" problem that may occur in the MEC technology.

With reference to the method 500, the foregoing describes a connectivity detection mechanism, namely, the connectivity detection between the node and the center system. The following describes the service linkage detection with reference to the method 600. It should be understood that the solutions in the method 500 and the method 600 may be used in combination, or may be independently used. This is not limited in this embodiment of this disclosure.

Figure 6:
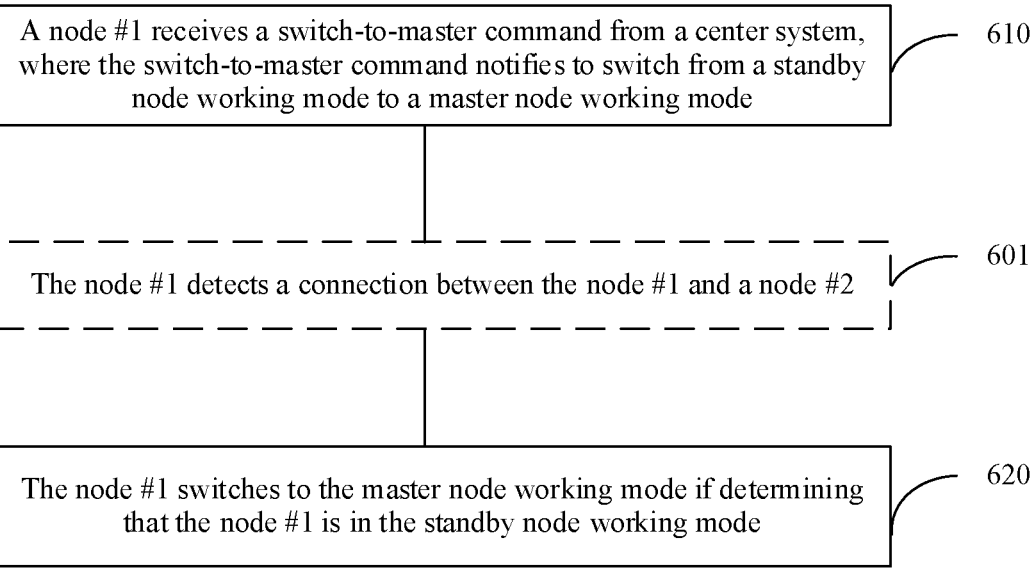
FIG. 6 is a schematic block diagram of a node control method according to yet another embodiment of this disclosure.

FIG. 6 is a schematic block diagram of a node control method 600 according to an embodiment of this disclosure. The method 600 may include the following steps.

610: A node #1 receives a switch-to-master command from a center system, where the switch-to-master command notifies to switch from a standby node working mode to a master node working mode.

For example, the node #1 may be a master node, or the node #1 is in the master node working mode; or the node #1 may be a standby node, or the node #1 is in the standby node working mode.

For the center system and the switch-to-master command, refer to the descriptions in the method 300. Details are not described herein again.

In a possible implementation, when the center system detects that a service connection channel between the center system and an edge device (or an edge system) in which the node #1 is located is disconnected, the center system may deliver the switch-to-master command to the edge device through a management channel.

It may be understood that the center system may determine, based on a service status, whether to send the switch-to-master command.

For example, the center system may detect whether a connection between the center system and a node (for example, the node #1) of the edge device is normal.

For an occasion and a manner of detection between the center system and the node, refer to the descriptions in the method 300. Details are not described herein again.

620: The node #1 switches to the master node working mode if determining that the node #1 is in the standby node working mode.

For example, the node #1 switches to the standby node working mode when determining that the node #1 is in the master node working mode. It may be understood that in some cases, the center system may determine switching between the master node and the standby node in the edge system. For example, when software fails, an original master node and an original standby node need to be switched. To be specific, the center system can be connected to two nodes, and the center system delivers a switch-to-master command (or may be referred to as a switch-to-master command) to the two nodes, so that the node originally in the master node working mode switches to the standby node working mode, and the node originally in the standby node working mode switches to the master node working mode.

In a possible case, the center system can be connected to only a specific node (for example, a node #1, where the node #1 is in a standby node working mode). In this case, the center system delivers the switch-to-master command to the node, or the center system delivers, to the node, a command for switching the node from the standby node to the master node. For example, after an application is started, the edge device may actively establish a gRPC connection between the edge device and the center system. After a gRPC channel is successfully established, a switch-to-master process ends.

In another possible case, the center system can be connected to two nodes (for example, a node #1 and a node #2). In this case, the center system delivers a switch-to-master command (or referred to as a switching command) to the two nodes, or the center system delivers, to the two nodes, a command for switching from an original master node to a standby node and switching from an original standby node to a master node. Dual-machine monitoring on a node may be performed based on a master-standby status of the node. For example, if the node is the master node, the node switches to the standby node working mode. If the node is the standby node, the node switches to the master node working mode. For example, after forced switching of the edge device succeeds, the edge device may actively establish a gRPC connection between the edge device and the center system. After a gRPC channel is successfully established, the forced switching ends. In this case, a possible scenario is that software fails, and an original master node and an original standby node need to be switched. To be specific, the center system can be connected to the two nodes, and the center system delivers a switch-to-master command to the two nodes, so that the original master node is switched to the standby node, and the original standby node is switched to the master node.

In this embodiment of this disclosure, an arbitration capability may be integrated into the center system for providing. For example, the center system may determine, based on a fault status of a service channel, whether to perform switching (to be specific, switch from the original master node to the standby node, and switch from the original standby node to the master node), instead of performing detection based on connectivity between an arbitration node and the edge device. Therefore, by integrating a switching capability into the center system, an additional resource waste can be reduced. In addition, whether to switch between the master node and the standby node is determined based on the fault status of the service channel. This can reduce unnecessary switching and save switching time. For example, this embodiment of this disclosure is further applicable to an MEC technology, to resolve a "dual-master" problem and a "no-master" problem that may occur in the MEC technology.

Optionally, the method 600 may further include step 601.

601: The node #1 detects a connection between the node #1 and a node #2.

For an occasion and a manner of detection between the nodes, refer to the descriptions in the method 300. Details are not described herein again.

Based on this embodiment of this disclosure, service linkage detection may be performed. To be specific, if a heartbeat between nodes is disconnected, and the nodes cannot sense states of peer ends, switching (namely, switching from an original master node to a standby node, and switching from an original standby node to a master node) may be determined based on a switch-to-master command delivered by the center system. In other words, the heartbeat between the nodes is disconnected, and the nodes cannot sense the states of the peer ends. If a service connection channel between the center system and the edge device is disconnected, the center system may deliver the switch-to-master command to the edge device through a management channel.

The foregoing describes the solution of the connectivity detection in combined with the service linkage detection with reference to the method 300 and the method 400, describes the solution of independently using the connectivity detection with reference to the method 500, and describes the solution of independently using the service linkage detection with reference to the method 600. For ease of understanding, with reference to FIG. 7, the following uses an example in which the center system is a central VNFM device, the edge device is an edge VNFM device, and the node detects a connection between the node and a gateway for description. It should be understood that for details not described in the method 700, refer to the descriptions in the method 300 to the method 600.

Figure 7:
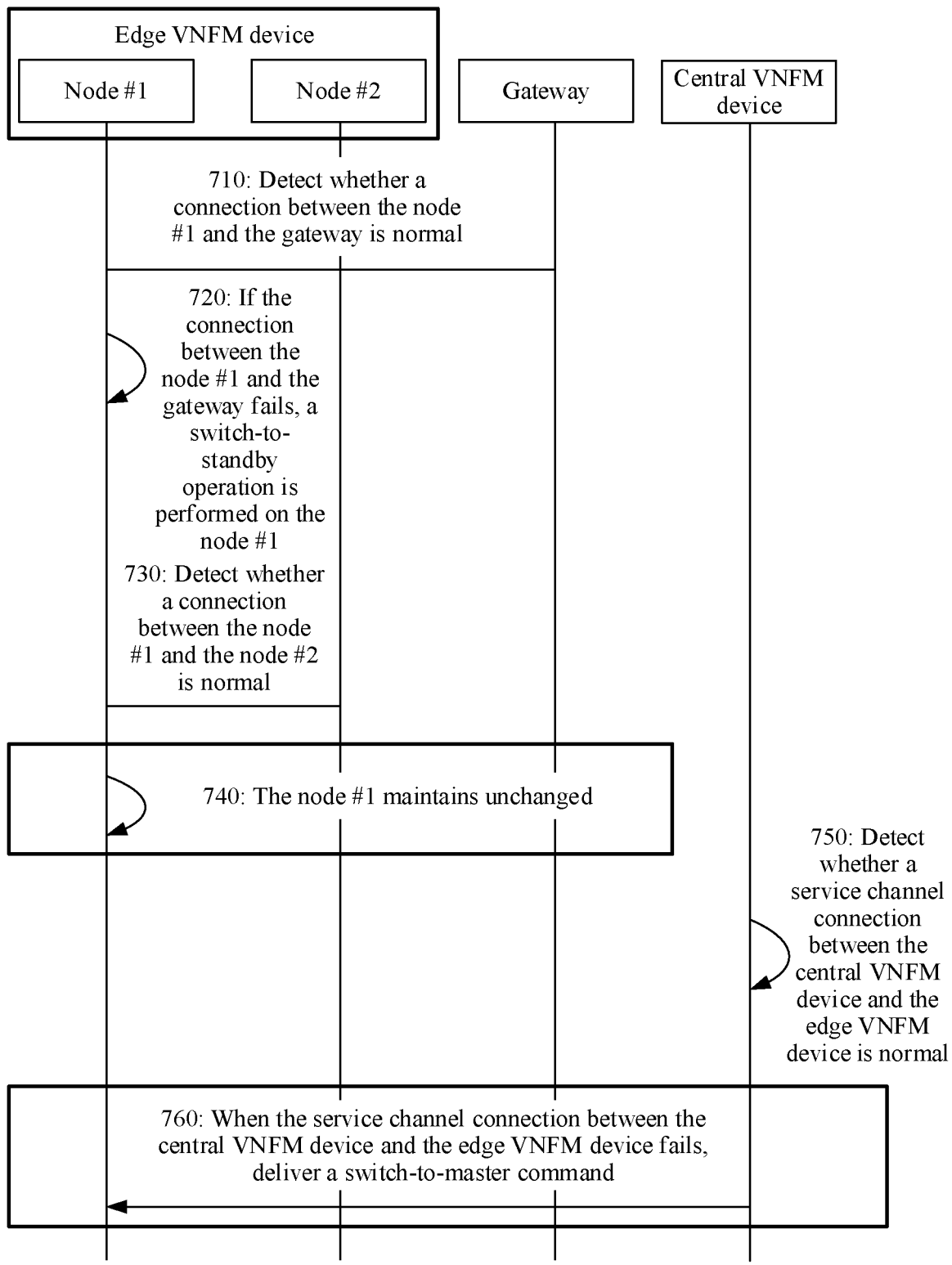
FIG. 7 is a schematic diagram of a node control method to which an embodiment of this disclosure is applicable.

FIG. 7 is a schematic diagram of a node control method 700 to which an embodiment of this disclosure is applicable. It is assumed that an edge VNFM device includes a node #1 and a node #2. In the node #1 and the node #2, one is a master node or is in a master node working mode, and the other is a standby node or is in a standby node working mode. The method 700 may include the following steps.

710: The node #1 detects whether a connection between the node #1 and a gateway is normal.

The node #1 may detect the connection between the node #1 and the gateway, to determine whether a connection between the node #1 and a center system is normal.

In a possible implementation, the node #1 may periodically detect the connection between the node #1 and the gateway. Alternatively, the node #1 may regularly detect the connection between the node #1 and the gateway. For example, after the system is started, the node #1 may periodically detect the connection between the node #1 and the gateway.

For example, the node #1 periodically detects the connection between the node #1 and the gateway based on a first preset time.

It should be understood that the node #1 may alternatively irregularly detect the connection between the node #1 and the gateway. This is not limited in this embodiment of this disclosure.

For the first preset time, refer to the descriptions in the method 300. Details are not described herein again.

In a possible implementation, the node #1 may detect, by pinging a gateway IP address, whether the connection between the node #1 and the gateway is normal.

For example, if a result of a ping command returns 0, the connection between the node #1 and the gateway is normal. If a result of the ping command returns another value, the connection between the node #1 and the gateway fails (or the connection is disconnected).

For example, related parameters of the ping command may include, but are not limited to, a specified quantity of times of continuous execution, a time interval of executing ping each time, and an execution timeout time.

In another possible implementation, the node #1 may detect, by sending a message, whether the connection between the node #1 and the gateway is normal.

For detection between the node and the gateway, refer to the descriptions in the method 300. Details are not described herein again.

720: If the connection between the node #1 and the gateway fails, a switch-to-standby operation is performed on the node #1.

It is assumed that the node #1 detects that the connection between the node and the gateway fails (or the connection is disconnected).

In a possible case, the node #1 is the standby node, or the node #1 is in the standby node working mode. In this case, if the node #1 detects that the connection between the node and the gateway fails, the node #1 maintains the standby node working mode unchanged.

In another possible case, the node #1 is the master node, or the node #1 is in the master node working mode. In this case, if the node #1 detects that the connection between the node and the gateway fails, the node #1 switches to the standby node working mode. For example, the node #1 stops all applications such as a program and a database on the node #1. For example, in this case, both the node #1 and the node #2 are the standby nodes. In this case, the edge VNFM device forms a "no-master" state. In this case, the standby node may be forced to be switched by the central VNFM device based on a service status, so that the node #2 is switched to the master node.

730: The node #1 detects whether a connection between the node #1 and the node #2 is normal.

In a possible implementation, the node #1 may periodically detect the connection between the node #1 and the node #2. Alternatively, the node #1 may regularly detect the connection between the node #1 and the node #2. For example, after the system is started, the node #1 may periodically detect the connection between the node #1 and the node #2.

For example, the node #1 periodically detects the connection between the node #1 and the node #2 based on a second preset time.

For the second preset time, refer to the descriptions in the method 300. Details are not described herein again.

In a possible implementation, the node #1 may detect, by pinging a gateway IP address, whether the connection between the node #1 and the node #2 is normal.

For example, if a result of a ping command returns 0, the connection between the node #1 and the node #2 is normal. If a result of the ping command returns another value, the connection between the node #1 and the node #2 fails.

For example, related parameters of the ping command may include, but are not limited to, a specified quantity of times of continuous execution, a time interval of executing ping each time, and an execution timeout time.

For related parameters of the ping command, refer to the descriptions in the method 300. Details are not described herein again.

740: If the node #1 detects a connection fault between the node #1 and the node #2, the node #1 maintains unchanged.

No processing is performed regardless of whether the node #1 is in the master node working mode or the standby node working mode. Conversely, assuming that the node #1 is in the standby node working mode, if the node #1 is switched from the standby node to the master node based on the connection fault between the node #1 and the node #2, a dual-master problem may occur. For example, a hardware fault (for example, a network adapter fault of a physical host, a physical host fault, or a network device fault) or a software fault (for example, an internal software fault not caused by a factor such as a network adapter or a network) may cause a fault that is of the connection between the node #1 and the node #2 and that is detected by the node #1. In this case, if the node #1 is switched from the standby node to the master node, two master nodes: the node #2 that is in the master node working mode and the node #1 switched from the standby node to the master node (namely, the dual-master problem) may occur. Therefore, in this embodiment of this disclosure, after the node #1 detects the connection fault between the node #1 and the node #2, no processing is performed regardless of whether the node #1 is in the master node working mode or the standby node working mode. This avoids the dual-master problem. Further, a no-master problem can be further avoided by using an indication of the central VNFM device.

For example, in the case described in the method 700, both the node #1 and the node #2 are the standby nodes. In this case, the edge VNFM device forms a "no-master" state. In this case, the standby node may be forced to be switched by the central VNFM device based on a service status, so that the node #2 is switched to the master node.

750: The central VNFM device detects whether a service channel connection between the central VNFM device and the edge VNFM device is normal.

When the edge VNFM device is in the "no-master state", for example, the "no-master state" described in step 720 or step 740, programs on all nodes are stopped. As a result, a gRPC channel established between the central VNFM device and the edge VNFM device is forcibly disconnected, and the central VNFM device receives an error code "unavailable".

After receiving the error code "unavailable", the central VNFM device may detect whether the service channel connection between the central VNFM device and the edge VNFM device is normal.

In a possible implementation, the central VNFM device detects, by remotely logging in to the node by using an SSH command, whether a connection between the central VNFM device and the node #1 or the node #2 is normal. If a result of the SSH command returns 0, it indicates that the connection between the central VNFM device and the edge VNFM device is normal. If a result of the SSH command returns another value, it indicates that the connection between the central VNFM device and the edge VNFM device fails.

It should be understood that any manner that can be used by the central VNFM device to detect whether the connection between the central VNFM device and the node is normal falls within the protection scope of embodiments of this disclosure. For example, the central VNFM device may further detect, in a ping manner or another manner, whether the connection between the central VNFM device and the node #1 or the node #2 is normal.

When detecting that the service channel connection between the central VNFM device and the edge VNFM device fails, the central VNFM device may further deliver a switch-to-master command.

760: When detecting that the service channel connection between the central VNFM device and the edge VNFM device fails, the central VNFM device delivers a switch-to-master command.

In a possible case, the central VNFM device can be connected to only a specific node (for example, a node #1, where the node #1 is in a standby node working mode). In this case, the central VNFM device delivers a switch-to-master command to the node, or the central VNFM device delivers, to the node, a command for switching the node from the standby node to the master node. For example, after an application is started, the edge VNFM device may actively establish a gRPC connection between the edge VNFM device and the central VNFM device. After a gRPC channel is successfully established, a switch-to-master process ends.

In another possible case, the central VNFM device can be connected to two nodes (for example, a node #1 and a node #2). In this case, the central VNFM device delivers a switch-to-master command (or referred to as a forced command) to the two nodes, or the central VNFM device delivers, to the two nodes, a command for switching from an original master node to a standby node and switching from an original standby node to a master node. Dual-machine monitoring on a node may be performed based on a master-standby status of the node. For example, if the node is the master node, the node switches to the standby node working mode. If the node is the standby node, the node switches to the master node working mode. For example, after forced switching of the edge VNFM device succeeds, the edge VNFM device may actively establish a gRPC connection between the edge VNFM device and the central VNFM device. After a gRPC channel is successfully established, the forced switching ends.

It should be understood that there is no strict sequence between the steps in the method 700. In an example, there is no sequence relationship between steps 710 and 720 and steps 730 and 740. For example, after the system is started, the node #1 regularly performs detection between the node #1 and the gateway, and regularly performs detection between the node #1 and the node #2. In another example, there is no sequence relationship between steps 710 and 720 and steps 750 and 760.

It should be further understood that the method 700 is mainly described by using the node #1 as an example, and the node #2 may also perform the steps described in the method 700. In other words, all the nodes in the edge device may perform the steps in the method 700.

It should be further understood that the method 700 is described by using the central VNFM device and the edge VNFM device as examples, and this embodiment of this disclosure is not limited thereto. For example, in actual communication, neither the center system nor the edge system is limited to the VNFM device.

In some of the foregoing embodiments, an example in which the edge system includes two nodes is used for description. This disclosure is not limited thereto. For example, the edge system may alternatively include at least two nodes. In addition, when the edge system includes a plurality of standby nodes, one of the standby nodes may be selected to be sent a switch-to-master command.

In some of the foregoing embodiments, an example in which the node detects whether the connection between the node and the gateway is normal to determine whether the connection between the node and the center system is normal is used for description. This disclosure is not limited thereto. For example, any manner that can be used to determine whether the connection between the node and the center system is normal is applicable to this embodiment of this disclosure.

Based on the foregoing technical solutions, a switch-to-standby operation is performed when a node in the master node working mode detects that a connection between the node and the center system (for example, the gateway) is disconnected. In other words, whether the node needs to be switched to the standby node (in other words, be switched from the original master node to the standby node) is determined through connectivity detection between the node and the center system. This avoids a dual-master problem. Alternatively, connectivity detection is added in addition to heartbeat detection. If the connectivity detection fails, the switch-to-standby operation is actively performed. This avoids the dual-master problem. For example, when the connectivity detection fails, to be specific, the master node detects that the connection between the master node and the center system fails or is disconnected, the switch-to-standby operation may be actively performed on the node, in other words, the master node may be actively switched to the standby node. In this manner, not only the dual-master problem can be avoided, but also a case in which it is found that a network is unavailable after switching can be avoided, so that invalid switching time consumption is reduced.

In addition, based on this embodiment of this disclosure, a switch-to-master operation is performed after the node in the standby node working mode receives the switch-to-master command from the center system. That is, service linkage detection may be performed, and an arbitration capability may be integrated into the center system for providing. For example, the center system may determine, based on a fault status of a service channel, whether to switch from the original standby node to the master node, instead of performing detection based on connectivity between an arbitration node and the edge device. Therefore, by integrating a switching capability into the center system, an additional resource waste can be reduced. In addition, whether to switch between the master node and the standby node is determined based on the fault status of the service channel. This can reduce unnecessary switching and save switching time.

Embodiments described in this specification may be independent solutions, or may be combined based on internal logic. All these solutions fall within the protection scope of this disclosure. For example, the solution described in the method 500 and the solution described in the method 600 may be independently used, or may be used in combination. This is not limited.

It may be understood that in the foregoing method embodiments, the methods and the operations implemented by the edge device (or the node) may alternatively be implemented by a component (for example, a chip or a circuit) that may be used in the edge device (or the node), and the methods and the operations implemented by the center system (for example, the central device) may alternatively be implemented by a component (for example, a chip or a circuit) that may be used in the center system (for example, the central device).

The methods provided in embodiments of this disclosure are described above in detail with reference to FIG. 3 to FIG. 7. Apparatuses provided in embodiments of this disclosure are described below in detail with reference to FIG. 8 and FIG. 9. It should be understood that descriptions of the apparatus embodiments correspond to the descriptions of the method embodiments. Therefore, for content not described in detail, refer to the foregoing method embodiments. For brevity, details are not described herein again.

A person skilled in the art may be aware that, with reference to units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In this embodiment of this disclosure, the edge device (or the node) or the center system (or the central device) may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in this embodiment of this disclosure, division into the modules is an example, and is only logical function division. During actual implementation, another division manner may be used. An example in which each functional module is obtained through division based on each corresponding function is used below for description.

Figure 8:
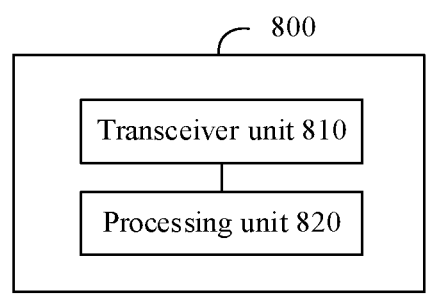
FIG. 8 is a schematic block diagram of a node control apparatus according to an embodiment of this disclosure.

FIG. 8 is a schematic block diagram of a node control apparatus according to an embodiment of this disclosure. The apparatus 800 includes a transceiver unit 810 and a processing unit 820. The transceiver unit 810 may implement a corresponding communication function, and the processing unit 820 is configured to process data. The transceiver unit 810 may also be referred to as a communication interface or a communication unit.

Optionally, the apparatus 800 may further include a storage unit. The storage unit may be configured to store instructions and/or data. The processing unit 820 may read the instructions and/or the data in the storage unit, to enable the communication apparatus to implement the foregoing method embodiments.

The apparatus 800 may be configured to perform actions performed by the node in the master node working mode in the foregoing method embodiments. In this case, the apparatus 800 may be a node or a component that may be configured on the node. The transceiver unit 810 is configured to perform transmitting/receiving-related operations on the node side in the master node working mode in the foregoing method embodiments, and the processing unit 820 is configured to perform processing-related operations on the node side in the master node working mode in the foregoing method embodiments.

Alternatively, the apparatus 800 may be configured to perform actions performed by the node in the standby node working mode in the foregoing method embodiments. In this case, the apparatus 800 may be a node or a component that may be configured on the node. The transceiver unit 810 is configured to perform transmitting/receiving-related operations on the node side in the standby node working mode in the foregoing method embodiments, and the processing unit 820 is configured to perform processing-related operations on the node side in the standby node working mode in the foregoing method embodiments.

Alternatively, the apparatus 800 may be configured to perform actions performed by the center system in the foregoing method embodiments. In this case, the apparatus 800 may be the center system or a component that may be configured in the center system. The transceiver unit Bio is configured to perform transmitting/receiving-related operations on the center system side in the foregoing method embodiments, and the processing unit 820 is configured to perform processing-related operations on the center system side in the foregoing method embodiments.

In a design, the apparatus 800 is configured to perform actions performed by the node in the foregoing embodiments. The processing unit 820 is configured to: monitor a status of a connection between the apparatus 800 and the center system when determining that a current working mode of the apparatus 800 is a master node working mode, and switch to a standby node working mode when determining that the connection between the apparatus 800 and the center system is disconnected. The transceiver unit Bio is configured to monitor a command from the center system when determining that the current working mode of the apparatus 800 is the standby node working mode, and the processing unit 820 is further configured to switch to the master node working mode when receiving a switch-to-master command sent by the center system, where the switch-to-master command notifies to switch from the standby node working mode to the master node working mode.

In an example, an edge system further includes a second node. The processing unit 820 is further configured to: monitor a status of a connection between the apparatus 800 and the second node; and maintain the current working mode of the apparatus 800 when determining that the connection between the apparatus 800 and the second node is disconnected or connected.

In another example, the processing unit 820 is specifically configured to monitor a status of a connection between the apparatus 800 and a gateway, where the gateway is located between the apparatus 800 and the center system.

In still another example, the gateway is located within the edge system.

In yet another example, the processing unit 820 is further configured to: determine, when detecting that the apparatus 800 is in an active state, that the current working mode of the apparatus 800 is the master node working mode, or determine, when detecting that the apparatus 800 is in an inactive state, that the current working mode of the apparatus 800 is the standby node working mode; or determine, when detecting that a service application on the apparatus 800 is in a running state, that the current working mode of the apparatus 800 is the master node working mode, or determine, when detecting that a service application on the apparatus 800 is in a stopped state, that the current working mode of the apparatus 800 is the standby node working mode; or determine, when detecting that no state identifier exists on the apparatus 800, that the current working mode of the apparatus 800 is the master node working mode, or determine, when detecting that a state identifier exists on the apparatus 800, that the current working mode of the apparatus 800 is the standby node working mode.

The apparatus 800 may implement the steps or the procedures performed by the node in the method 300 to the method 700 according to embodiments of this disclosure. The apparatus 800 may include units configured to perform the methods performed by the node in the method 300 in FIG. 3 to the method 700 in FIG. 7. In addition, the units in the apparatus 800 and the foregoing other operations and/or functions are separately intended to implement corresponding procedures of the method 300 in FIG. 3 to the method 700 in FIG. 7.

When the apparatus 800 is configured to perform the method 300 in FIG. 3, the transceiver unit 810 may be configured to perform step 320 in the method 300, and the processing unit 820 may be configured to perform steps 310 and 330 in the method 300.

When the apparatus 800 is configured to perform the method 400 in FIG. 4, the transceiver unit 810 may be configured to perform step 430 in the method 400, and the processing unit 820 may be configured to perform steps 410, 420, and 401 in the method 400.

When the apparatus 800 is configured to perform the method 500 in FIG. 5, the processing unit 820 may be configured to perform steps 510, 520, and 501 in the method 500.

When the communication apparatus 800 is configured to perform the method 600 in FIG. 6, the transceiver unit 810 may be configured to perform step 610 in the method 600, and the processing unit 820 may be configured to perform steps 620 and 601 in the method 600.

When the communication apparatus 800 is configured to perform the method 700 in FIG. 7, the transceiver unit 810 may be configured to perform step 760 in the method 700, and the processing unit 820 may be configured to perform steps 710, 720, 730, and 740 in the method 700.

It should be understood that a specific process in which the units perform the foregoing corresponding steps is described in detail in the foregoing method embodiments. For brevity, details are not described herein again.

In another design, the apparatus 800 is configured to perform actions performed by the center system in the foregoing embodiments. The processing unit 820 is configured to detect a service channel of an edge system. The edge system includes a first node and a second node. The transceiver unit 810 is configured to send a switch-to-master command to the first node and/or the second node when the service channel of the edge system fails, where the switch-to-master command notifies to switch from the standby node working mode to the master node working mode.

In an example, the processing unit 820 is specifically configured to: detect whether a connection between the apparatus 800 and the first node or the second node is normal; and determine, when detecting that the connection between the apparatus 800 and the first node or the second node is disconnected, that the service channel of the edge system fails.

In another example, the processing unit 820 is specifically configured to: detect, by remotely logging in to the node by using a secure shell SSH command, whether the connection between the apparatus 800 and the first node or the second node is normal.

The apparatus 800 may implement the steps or the procedures performed by the center system in the method 300 to the method 700 according to embodiments of this disclosure. The apparatus 800 may include units configured to perform the methods performed by the center system in the method 300 in FIG. 3 to the method 700 in FIG. 7. In addition, the units in the apparatus 800 and the foregoing other operations and/or functions are separately intended to implement corresponding procedures of the method 300 in FIG. 3 to the method 700 in FIG. 7.

When the apparatus 800 is configured to perform the method 300 in FIG. 3, the transceiver unit 810 may be configured to perform step 320 in the method 300, and the processing unit 820 may be configured to perform step 320 in the method 300.

When the apparatus 800 is configured to perform the method 400 in FIG. 4, the transceiver unit 810 may be configured to perform step 430 in the method 400, and the processing unit 820 may be configured to perform step 410 in the method 400.

When the apparatus 800 is configured to perform the method 600 in FIG. 6, the transceiver unit 810 may be configured to perform step 610 in the method 600.

When the apparatus 800 is configured to perform the method 700 in FIG. 7, the transceiver unit 810 may be configured to perform step 760 in the method 700, and the processing unit 820 may be configured to perform step 750 in the method 700.

It should be understood that a specific process in which the units perform the foregoing corresponding steps is described in detail in the foregoing method embodiments. For brevity, details are not described herein again.

In another design, the apparatus 800 is configured to perform actions performed by the node control system in the foregoing embodiments. The node control system includes: a first node, a second node, and a center system. The first node and the second node are located in an edge system, and the first node and the second node are both connected to the center system. A current working mode of the first node is a master node working mode, and a current working mode of the second node is a standby node working mode. The processing unit 820 is configured to monitor a status of a connection between the first node and the center system, to enable the first node to switch to the standby node working mode when the connection between the first node and the center system is disconnected. The transceiver unit 810 is configured to send a switch-to-master command to the second node when a connection between the center system and the first node is disconnected, where the switch-to-master command notifies to switch from the standby node working mode to the master node working mode. The processing unit 820 is further configured to enable the second node to switch to the master node working mode based on the switch-to-master command.

In an example, the processing unit 820 is further configured to: monitor a status of a connection between the first node and the second node; and maintain the current working mode of the first node and/or the current working mode of the second node when determining that the connection between the first node and the second node is disconnected or connected.

In another example, the processing unit 820 is specifically configured to monitor a status of a connection between the first node and a gateway, where the gateway is located between the first node and the center system.

In still another example, the gateway is located within the edge system.

The apparatus 800 may implement the steps or the procedures performed by the node control system in the method 300 to the method 700 according to embodiments of this disclosure. The apparatus 800 may include units configured to perform the methods performed by the node control system in the method 300 in FIG. 3 to the method 700 in FIG. 7. In addition, the units in the apparatus 800 and the foregoing other operations and/or functions are separately intended to implement corresponding procedures of the method 300 in FIG. 3 to the method 700 in FIG. 7.

The processing unit 820 in the foregoing embodiment may be implemented by at least one processor or a processor-related circuit. The transceiver unit 810 may be implemented by using a transceiver or a transceiver-related circuit. The transceiver unit 810 may also be referred to as a communication unit or a communication interface. The storage unit may be implemented through at least one memory.

Figure 9:
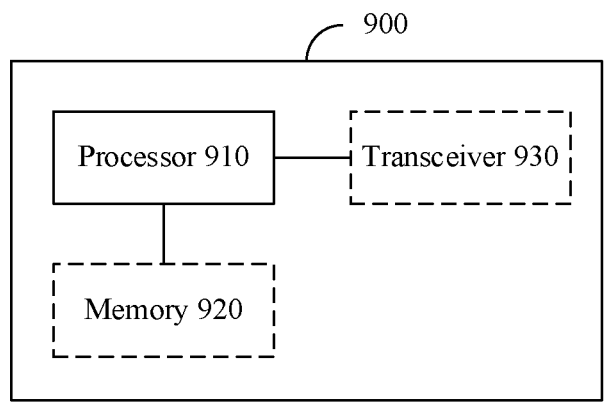
FIG. 9 is a schematic block diagram of a node control device according to an embodiment of this disclosure.

It should be understood that the transceiver unit 810 in the apparatus 800 may correspond to a transceiver 930 in a device 900 shown in FIG. 9, and the processing unit 820 in the apparatus 800 may correspond to a processor 910 in the device 900 shown in FIG. 9.

FIG. 9 is a schematic block diagram of a node control device 900 according to an embodiment of this disclosure. As shown in the figure, the device 900 includes a processor 910. The processor 910 is coupled to a memory 920. The memory 920 is configured to store a computer program or instructions and/or data. The processor 910 is configured to execute the computer program or the instructions and/or the data stored in the memory 920, so that the methods in the foregoing method embodiments are performed.

Optionally, the device 900 includes one or more processors 910.

Optionally, as shown in FIG. 9, the device 900 may further include the memory 920.

Optionally, the device 900 may include one or more memories 920.

Optionally, the memory 920 may be integrated with the processor 910, or separately disposed from the processor 910. To be specific, the processor 910 and the memory 920 may be combined into one processing apparatus, and the processor 910 is configured to execute program code stored in the memory 920 to implement the foregoing functions. During specific implementation, the memory 920 may alternatively be integrated into the processor 910, or may be independent of the processor 910.

Optionally, as shown in FIG. 9, the device 900 may further include a transceiver 930, and the transceiver 930 is configured to receive and/or send a signal. For example, the processor 910 is configured to control the transceiver 930 to receive and/or send a signal. The transceiver 930 may include an input interface (or referred to as a receiver) and an output interface (or referred to as a transmitter). The transceiver may also be referred to as a communication interface. The transceiver may further include an antenna. There may be one or more antennas.

In a solution, the device 900 is configured to implement operations performed by the node in the foregoing method embodiments. In a possible design, the device 900 may be the node in the foregoing method embodiments, or may be a chip configured to implement functions of the node in the foregoing method embodiments.

For example, the processor 910 is configured to implement processing-related operations performed by the node in the foregoing method embodiments, and the transceiver 930 is configured to implement transmitting/receiving-related operations performed by the node in the foregoing method embodiments.

Specifically, the device 900 may correspond to the node in FIG. 3 to FIG. 7 according to embodiments of this disclosure, and the device 900 may include units configured to perform the methods performed by the node in the method 300 in FIG. 3 to the method 700 in FIG. 7. In addition, the units in the device 900 and the foregoing other operations and/or functions are separately intended to implement corresponding procedures of the method 300 in FIG. 3 to the method 700 in FIG. 7. It should be understood that a specific process in which the units perform the foregoing corresponding steps is described in detail in the foregoing method embodiments. For brevity, details are not described herein again.

In another solution, the device 900 is configured to implement operations performed by the center system in the foregoing method embodiments. In a possible design, the device 900 may be the center system in the foregoing method embodiments, or may be a chip configured to implement functions of the center system in the foregoing method embodiments.

For example, the processor 910 is configured to implement processing-related operations performed by the center system in the foregoing method embodiments, and the transceiver 930 is configured to implement transmitting/receiving-related operations performed by the center system in the foregoing method embodiments.

Specifically, the device 900 may correspond to the center system (or the central device) in FIG. 3 to FIG. 7 according to embodiments of this disclosure, and the device 900 may include units configured to perform the methods performed by the center system in the method 300 in FIG. 3 to the method 700 in FIG. 7. In addition, the units in the device 900 and the foregoing other operations and/or functions are separately intended to implement corresponding procedures of the method 300 in FIG. 3 to the method 700 in FIG. 7. It should be understood that a specific process in which the units perform the foregoing corresponding steps is described in detail in the foregoing method embodiments. For brevity, details are not described herein again.

In another solution, the device 900 is configured to implement operations performed by the node control system in the foregoing method embodiments. In a possible design, the device 900 may be the node control system in the foregoing method embodiments, or may be a chip configured to implement functions of the node control system in the foregoing method embodiments.

For example, the processor 910 is configured to implement processing-related operations performed by the node control system in the foregoing method embodiments, and the transceiver 930 is configured to implement transmitting/receiving-related operations performed by the node control system in the foregoing method embodiments.

Specifically, the device 900 may correspond to the node control system (for example, including the first node, the second node, and the center system) in FIG. 3 to FIG. 7 according to embodiments of this disclosure. The device 900 may include units configured to perform the methods performed by the node control system in the method 300 in FIG. 3 to the method 700 in FIG. 7. In addition, the units in the device 900 and the foregoing other operations and/or functions are separately intended to implement corresponding procedures of the method 300 in FIG. 3 to the method 700 in FIG. 7. It should be understood that a specific process in which the units perform the foregoing corresponding steps is described in detail in the foregoing method embodiments. For brevity, details are not described herein again.

An embodiment of this disclosure further provides a computer-readable storage medium. The computer-readable storage medium stores computer instructions used to implement the method performed by the node or the method performed by the center system in the foregoing method embodiments.

For example, when the computer program is executed by a computer, the computer is enabled to implement the method performed by the node or the method performed by the center system in the foregoing method embodiments.

An embodiment of this disclosure further provides a computer program product including instructions. When the instructions are executed by a computer, the computer is enabled to implement the method performed by the node or the method performed by the center system in the foregoing method embodiments.

An embodiment of this disclosure further provides an edge system. The edge system includes the nodes, for example, the first node and the second node (or the node #1 and the node #2), in the foregoing embodiments.

An embodiment of this disclosure further provides a node control system. The system includes the nodes (for example, the first node and/or the second node) and the center system in the foregoing embodiments.

It may be clearly understood by a person skilled in the art that, for convenience and brief description, for explanations and beneficial effects of related content in any device provided above, refer to the corresponding method embodiment provided above. Details are not described herein again.

In this embodiment of this disclosure, the terminal device or the network device may include a hardware layer, an operating system layer running above the hardware layer, and an application layer running above the operating system layer. The hardware layer may include hardware such as a central processing unit (CPU), a memory management unit (MMU), and a memory (also referred to as a main memory). An operating system of the operating system layer may be any one or more computer operating systems implementing service processing through a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in this embodiment of this disclosure is not specifically limited in this embodiment of this disclosure, provided that a program that records code of the method provided in this embodiment of this disclosure can be run to perform communication according to the method provided in this embodiment of this disclosure. For example, the method provided in this embodiment of this disclosure may be performed by the terminal device or the network device, or may be performed by a functional module that is in the terminal device or the network device and that can invoke and execute a program.

Aspects or features of this disclosure may be implemented as a method, an apparatus, or a product that uses standard programming and/or engineering technologies. The term "product" used in this specification may cover a computer program that is accessible from any computer-readable device, carrier, or medium.

The computer-readable storage medium may be any usable medium accessible by a computer, or a data storage device, such as a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (CD), or a digital versatile disc (DVD)), a smart card, and a flash memory device (for example, an erasable programmable read-only memory (EPROM), a card, a stick, or a key drive), or a semiconductor medium (for example, a solid-state disk (SSD), a USB flash drive, a read-only memory (ROM), or a random access memory (RAM).

Various storage media described in this specification may indicate one or more devices and/or other machine-readable media that are configured to store information. The term "machine-readable media" may include, but is not limited to, a radio channel and various other media that can store, include, and/or carry instructions and/or data.

It should be understood that the processor mentioned in this embodiment of this disclosure may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should be further understood that the memory mentioned in this embodiment of this disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) may be integrated into the processor.

It should be further noted that the memory described in this specification is intended to include, but is not limited to, these memories and any memory of another proper type.

In the several embodiments provided in this disclosure, it should be understood that the disclosed apparatus and method may be implemented in other manners. For example, the foregoing apparatus embodiments are only examples. For example, division into the foregoing units is only logical function division, and may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The foregoing units described as separate components may or may not be physically separate, and components displayed as units may or may not be physical units, may be located in one position, or may be distributed on a plurality of network units. Some or all of the units may be selected based on actual requirements to implement the solutions provided in this disclosure.

In addition, functional units in this embodiment of this disclosure may be integrated into one unit, or each of the units may exist alone physically, or two or more units are integrated into one unit.

All or some of the foregoing embodiments may be implemented by software, hardware, firmware, or any combination thereof.

When the software is used for implementation, all or some of embodiments may be implemented in a form of a computer program product. The computer program product includes one or more computer instructions. When the computer program instructions are loaded and executed on the computer, the procedures or functions according to embodiments of this disclosure are all or partially generated. The computer may be a general-purpose computer, a special-purpose computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims and this specification.

What is claimed is:

1. A method, applicable to a node control system, wherein the node control system comprises:
 a first node, a second node, and a center system, wherein the first node and the second node are located in an edge system, the first node and the second node are both connected to the center system, a current working mode of the first node is a master node working mode, and a second current working mode of the second node is a standby node working mode, and
 wherein the method comprises:
 monitoring, by the first node, a status of a connection between the first node and the center system, and switching, by the first node, to the standby node working mode when the connection between the first node and the center system is disconnected;
 monitoring, by the center system, the status of the connection between the center system and the first node, and sending a switch-to-master command to the second node when the connection between the center system and the first node is disconnected, wherein the switch-to-master command notifies the second node to switch from the standby node working mode to the master node working mode; and
 switching, by the second node, to the master node working mode based on the switch-to-master command.

2. The method according to claim 1, wherein the method further comprises:
 monitoring, by the first node, a second status of a second connection between the first node and the second node, or monitoring, by the second node, the second status of the second connection between the second node and the first node; and
 maintaining the current working mode of the first node or the second current working mode of the second node when determining that the second connection between the first node and the second node is disconnected or connected.

3. The method according to claim 1, wherein the monitoring, by the first node, the status of the connection between the first node and the center system comprises:
 monitoring, by the first node, a third status of a third connection between the first node and a gateway, wherein the gateway is located between the first node and the center system.

4. The method according to claim 3, wherein the gateway is located within the edge system.

5. The method according to claim 1, further comprising:
 determining, by the first node, when detecting that the first node is in an active state, that the current working mode of the first node is the master node working mode, or determining, by the first node, when detecting that the first node is in an inactive state, that the current working mode of the first node is the standby node working mode.

6. The method according to claim 1, further comprising:
 determining, by the first node, when detecting that a service application on the first node is in a running state, that the current working mode of the first node is the master node working mode, or determining, by the first node, when detecting that the service application on the first node is in a stopped state, that the current working mode of the first node is the standby node working mode.

7. The method according to claim 1, further comprising:
 determining, by the first node, when detecting that no state identifier exists on the first node, that the current working mode of the first node is the master node working mode, or determining, by the first node, when detecting that a state identifier exists on the first node, that the current working mode of the first node is the standby node working mode.

8. A method, applicable to a first node in an edge system, wherein the first node is connected to a center system, and the method comprises:
 monitoring, by the first node, a status of a connection between the first node and the center system when determining that a current working mode of the first node is a master node working mode, and switching, by the first node, to a standby node working mode when determining that the connection between the first node and the center system is disconnected; and
 monitoring, by the first node, a command from the center system when determining that the current working mode of the first node is the standby node working mode, and switching to the master node working mode when receiving a switch-to-master command sent by the center system, wherein the switch-to-master command notifies the first node to switch from the standby node working mode to the master node working mode.

9. The method according to claim 8, wherein the edge system further comprises a second node, the second node is connected to the center system, and the method further comprises:
 monitoring, by the first node, a second status of a second connection between the first node and the second node; and
 maintaining the current working mode of the first node when determining that the connection between the first node and the second node is disconnected or connected.

10. The method according to claim 8, wherein the monitoring, by the first node, the status of the connection between the first node and the center system comprises:
 monitoring, by the first node, a third status of a third connection between the first node and a gateway, wherein the gateway is located between the first node and the center system.

11. The method according to claim 10, wherein the gateway is located within the edge system.

12. The method according to claim 8, wherein the method further comprises:
 determining, by the first node, when detecting that the first node is in an active state, that the current working mode of the first node is the master node working mode, or determining, by the first node, when detecting that the first node is in an inactive state, that the current working mode of the first node is the standby node working mode;
 or
 determining, by the first node, when detecting that a service application on the first node is in a running state, that the current working mode of the first node is the master node working mode, or determining, by the first node, when detecting that the service application on the first node is in a stopped state, that the current working mode of the first node is the standby node working mode;
or
determining, by the first node, when detecting that no state identifier exists on the first node, that the current working mode of the first node is the master node working mode, or determining, by the first node, when detecting that a state identifier exists on the first node, that the current working mode of the first node is the standby node working mode.

13. A system, comprising:
a first node, a second node, and a center system,
wherein the first node and the second node are located in an edge system, the first node and the second node are both connected to the center system, a current working mode of the first node is a master node working mode, and a second current working mode of the second node is a standby node working mode,
wherein the first node comprises:
  first at least one processor; and
  a first non-transitory computer readable storage medium storing first programming, the first programming including first instructions that, when executed by the first at least one processor, cause the first node to perform first operations including:
  monitoring a status of a connection between the first node and the center system, and switching to the standby node working mode when the connection between the first node and the center system is disconnected,
wherein the center system comprises:
  third at least one processor; and
  a third non-transitory computer readable storage medium storing third programming, the third programming including third instructions that, when executed by the third at least one processor, cause the center system to perform third operations including:
  monitoring the status of the connection between the center system and the first node, and sending a switch-to-master command to the second node when the connection between the center system and the first node is disconnected, wherein the switch-to-master command notifies the second node to switch from the standby node working mode to the master node working mode, and
wherein the second node comprises:
  second at least one processor; and
  a second non-transitory computer readable storage medium storing second programming, the second programming including second instructions that, when executed by the second at least one processor, cause the second node to perform second operations including:
  switching to the master node working mode based on the switch-to-master command.

14. The system according to claim 13, wherein the first operations performed by the first node further comprise:
monitoring a second status of a second connection between the first node and the second node; and
maintaining the current working mode of the first node or the second current working mode of the second node when determining that the second connection between the first node and the second node is disconnected or connected.

15. The system according to claim 13, wherein the monitoring the status of the connection between the first node and the center system performed by the first node comprises:
monitoring a third status of a third connection between the first node and a gateway, wherein the gateway is located between the first node and the center system.

16. The system according to claim 15, wherein the gateway is located within the edge system.

17. The system according to claim 13, wherein the first operations performed by the first node further comprise:
determining, when detecting that the first node is in an active state, that the current working mode of the first node is the master node working mode, or determining, when detecting that the first node is in an inactive state, that the current working mode of the first node is the standby node working mode.

18. The system according to claim 13, wherein the first operations performed by the first node further comprise:
determining, when detecting that a service application on the first node is in a running state, that the current working mode of the first node is the master node working mode, or determining, when detecting that the service application on the first node is in a stopped state, that the current working mode of the first node is the standby node working mode.

19. The system according to claim 13, wherein the first operations performed by the first node further comprise:
determining, when detecting that no state identifier exists on the first node, that the current working mode of the first node is the master node working mode, or
determining, when detecting that a state identifier exists on the first node, that the current working mode of the first node is the standby node working mode.

* * * * *